United States Patent [19]
Ching et al.

[11] 3,971,888
[45] July 27, 1976

[54] SYNCHRONIZATION SYSTEM FOR VARIABLE LENGTH ENCODED SIGNALS

[75] Inventors: Yau Chau Ching, Morganville; Ming-Chwan Chow, Holmdel, both of N.J.

[73] Assignee: Bell Telephone Laboratories, Incorporated, Murray Hill, N.J.

[22] Filed: Apr. 2, 1975

[21] Appl. No.: 564,285

[52] U.S. Cl. .................. 178/69.5 TV; 178/69.5 R; 178/DIG. 3
[51] Int. Cl.² .................................... H04N 5/04
[58] Field of Search .............. 178/69.5 TV, DIG. 3, 178/69.5 R, DIG. 22; 325/41, 38 R; 179/15 BS, 2 TV

[56] References Cited
UNITED STATES PATENTS

| | | | |
|---|---|---|---|
| 3,597,539 | 8/1971 | Clark | 179/15 BS |
| 3,772,475 | 11/1973 | Loffreda | 179/15 BS |
| 3,795,763 | 3/1974 | Golding et al. | 178/DIG. 3 |
| 3,798,378 | 3/1974 | Epstein | 179/15 BS |
| 3,830,965 | 8/1974 | Beaudette | 178/DIG. 3 |
| 3,867,579 | 2/1975 | Colton et al. | 179/15 BS |

*Primary Examiner*—John C. Martin
*Attorney, Agent, or Firm*—Stephen M. Gurey; John K. Mullarney

[57] ABSTRACT

In a digital transmission system that encodes each sample of a video signal into a variable bit length data word to form a consecutive stream of variable bit length data words, synchronization between the received data words and their properly associated spatial addresses is maintained by periodically interposing synchronization words into the transmitted data stream. After initialization at the beginning of a video field, each picture element along each active scan line is consecutively sampled and encoded into a variable bit length data word. Each scan line is divided into segments having a predetermined number of sample positions included therein. A word counter cyclically counts each sample as it is encoded to provide a representation of the horizontal position of each code word within a segment along a scan line. The relative horizontal position of each code word is thus represented by the count of the word counter. The cumulative number of bits in the data stream is simultaneously cyclically counted as each sample is encoded. At each instant at which the bit counter reaches a predetermined count, an error correction encoded representation of the present count of the word counter (i.e., a synchronization word) is inserted into the data stream. At the receiver, after initialization, each successive variable bit length code word is decoded and directed to the next consecutive picture element. A word counter counts each word as it is decoded while a bit counter cyclically counts each received data bit. At each instant at which the bit counter reaches the predetermined count, the synchronization word in the data stream is decoded and the relative horizontal position indicated by the synchronization word is compared with the spatial position indicated by the word decoder. If a deviation exists between the two spatial positions, indicative of a transmission error in the data stream, the word counter is updated and the next successively decoded variable length data words are addressed to their proper spatial positions.

20 Claims, 16 Drawing Figures

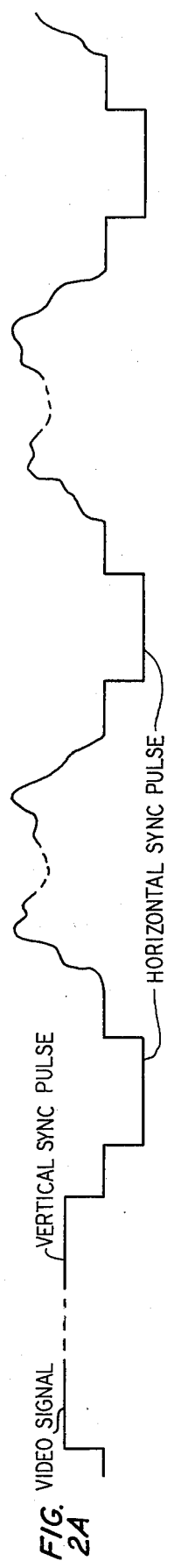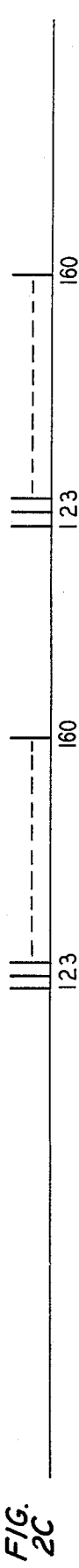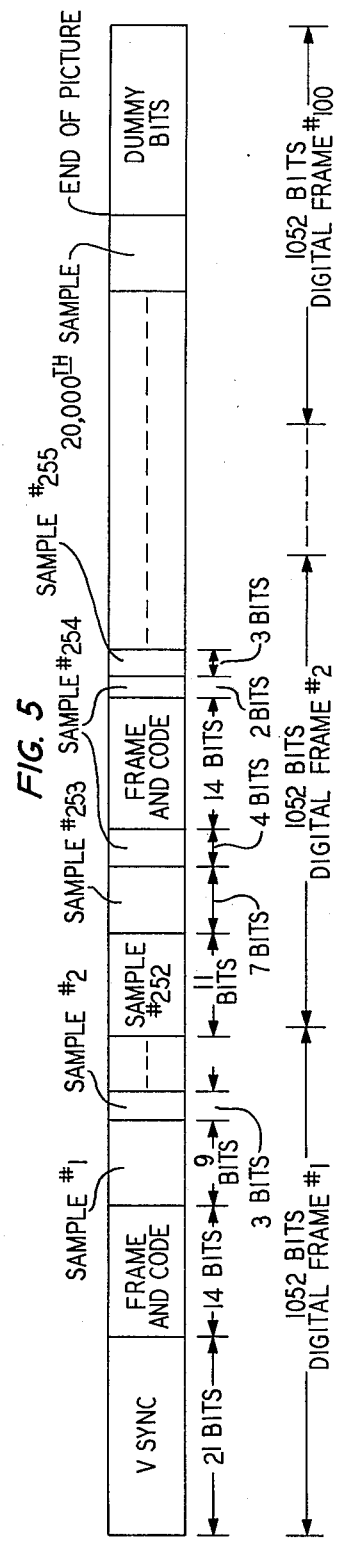

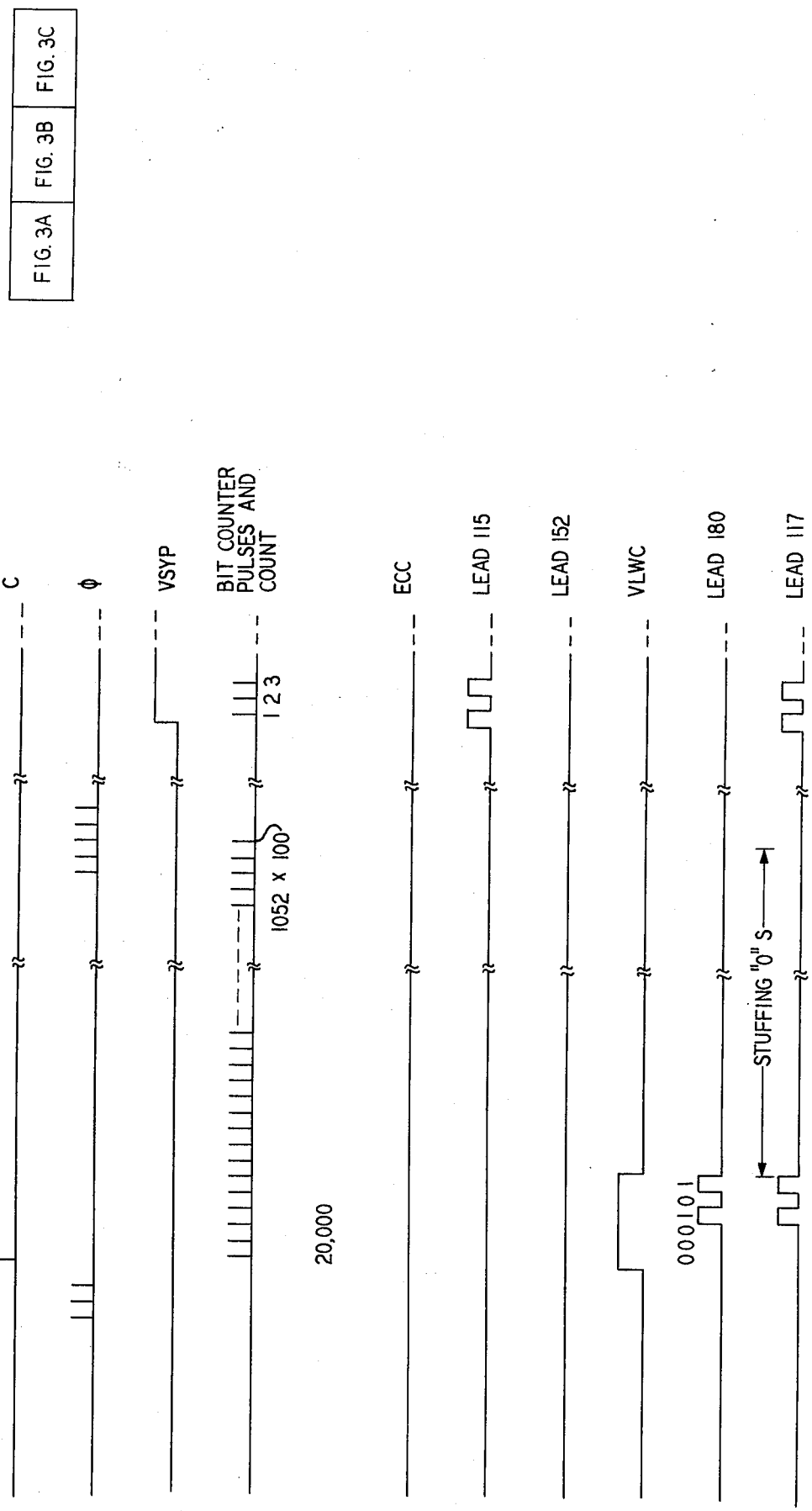

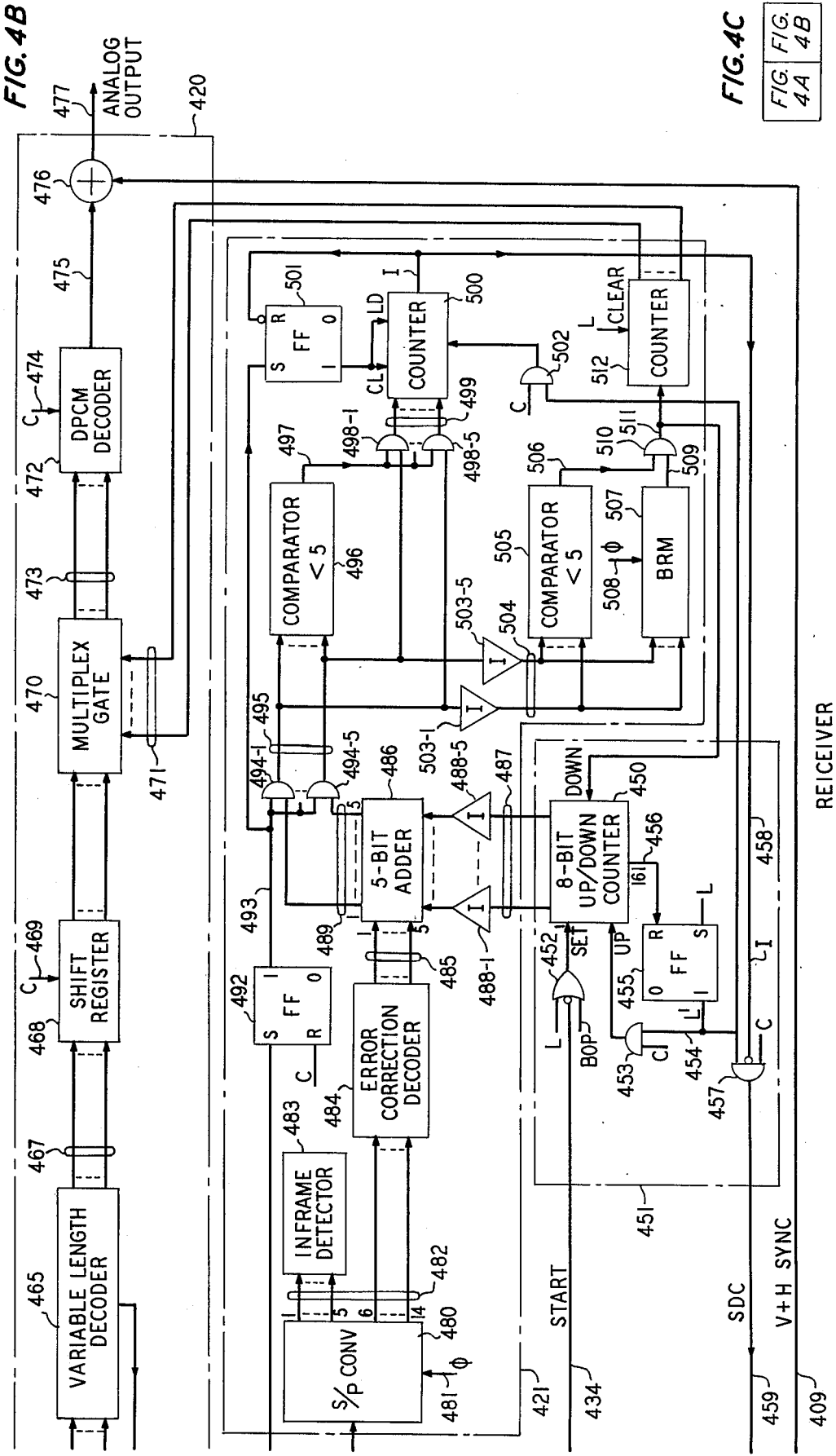

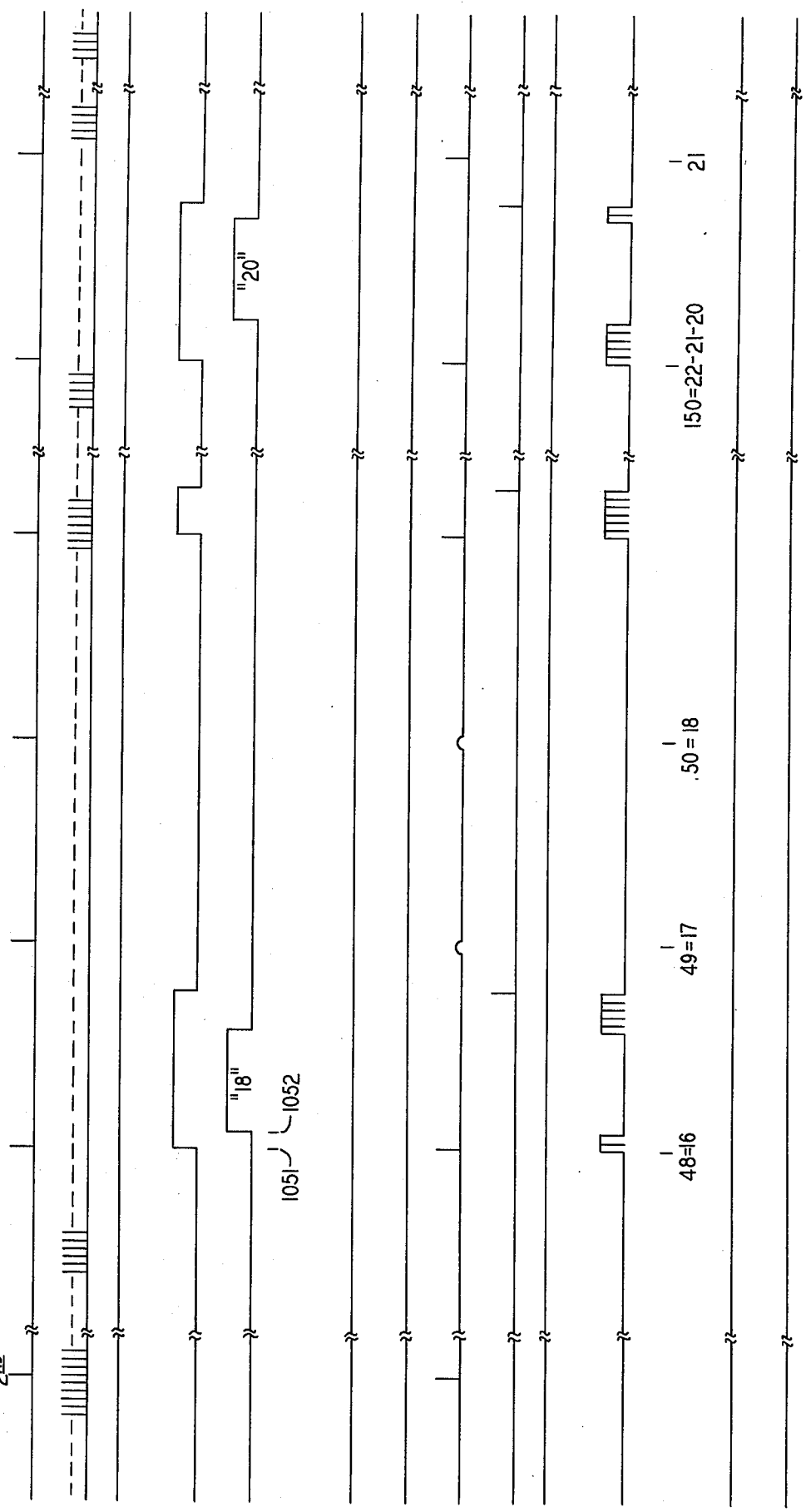

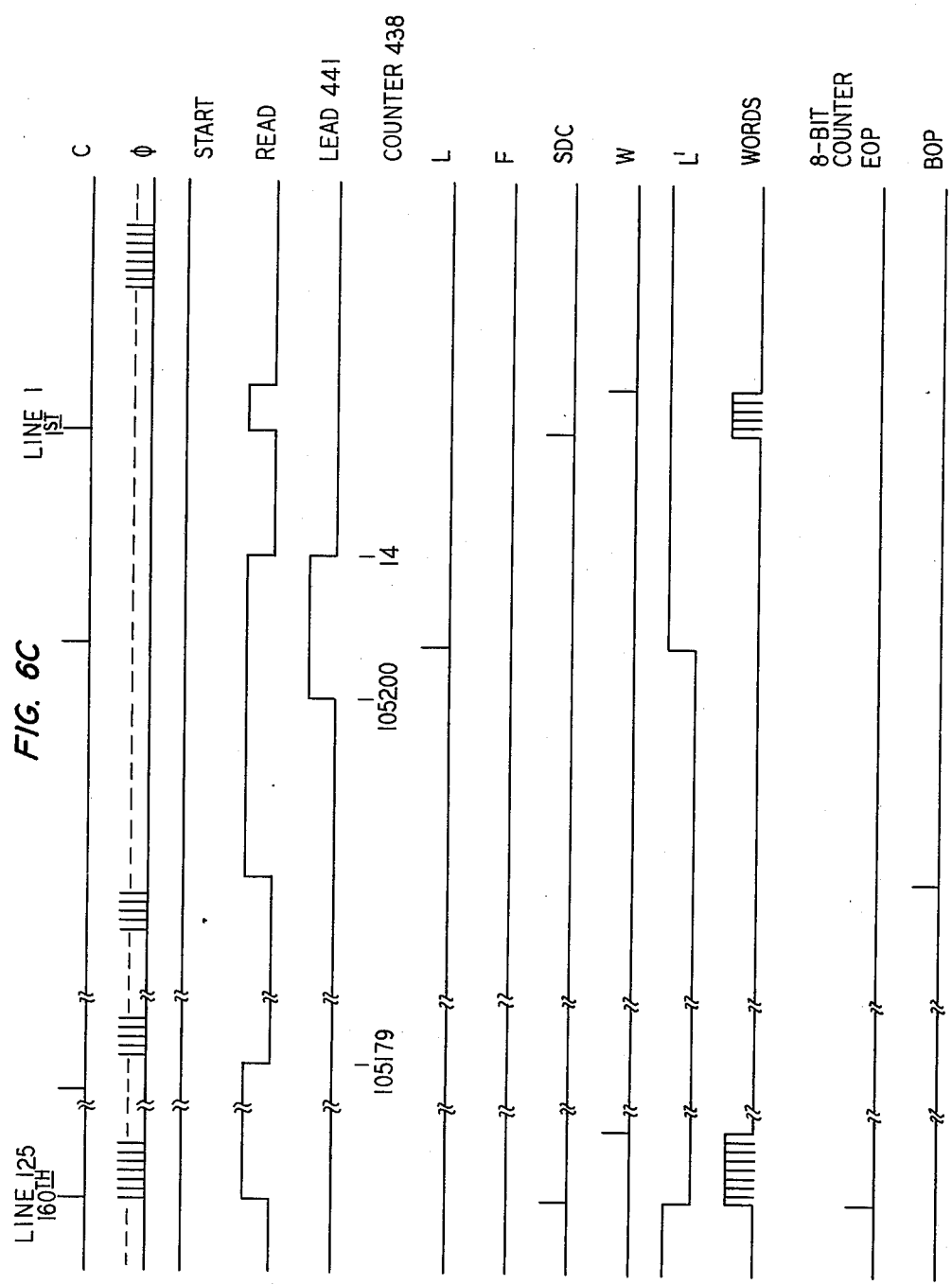

SYNCHRONIZATION SYSTEM FOR VARIABLE LENGTH ENCODED SIGNALS

BACKGROUND OF THE INVENTION

This invention relates to the synchronization of variable length encoded video signals.

Variable length encoding, as is well known in the art, provides an efficient means for transmitting digitally encoded signal samples that have unequal probabilities of occurrence. Accordingly, sample levels that have a higher probability of occurrence are assigned code words that have fewer numbers of bits than the words assigned to the less frequently occurring sample levels. The average code word length is determined by a weighting of each word in the alphabet of code words with its expected relative occurrence. The average code word length of a variable length code will thus be less than the code word length required for fixed length encoding. A differentially encoded PCM signal, therefore, in which the expected frequency of signal sample levels is generally unequally distributed, can be efficiently encoded using variable length encoding techniques.

The use of variable length encoding requires that certain constraints be placed on the coding procedures so that each digital word can be unambiguously detected in a bit stream of concatenated code words. Accordingly, each variable length digital word is chosen so that the digits that comprise a shorter length variable length code word cannot occur within a longer code word. Thus, in a bit stream containing a string of variable bit length words, each word can be individually identified and decoded.

A transmission error in a stream of variable length words will, however, cause a decoder to lose word synchronization. When word synchronization is lost while decoding a variable length word digital stream, data outside the code word containing the error may also be improperly decoded. That is, a variable length decoder examines a string of digits until it is determined that a digital string is a word in the alphabet of possible transmitted words. Therefore, if a transmission error causes a digit inversion in the received digital sequence, the variable length decoder could determine that a sequence of digits shorter than the digits in the transmitted word forms a different word. When the decoder thereupon commences to examine the digits that follow, further decoding errors will result until the decoder regains word synchronization. Similarly, as a result of a transmission error, the decoder may continue to examine a string of digits beyond the number of digits in the transmitted word as it tries to detect a word in the alphabet of possible words. Again, until word synchronization is regained, there will be decoding errors in words other than the word in which the transmission error occurred.

Proper word synchronization is critical when, for example, samples are representations of the magnitude of a signal having spatial coordinates, such as a video or facsimile signal. A loss of word synchronization by the decoder will cause a miscount of received data words resulting in improperly addressed code words. A spatially unsynchronized scrambled decoding picture will thereupon result.

SUMMARY OF THE INVENTION

The primary object of the present invention is to assure synchronization of variable bit length encoded signals which are subject to data transmission errors.

A related object of the present invention is to maintain the accumulated count of received variable bit length code words in synchronism with the count of transmitted variable bit length code words.

In accordance with the present invention a stream of variable bit length code words is maintained in word synchronization by periodically interposing synchronization words in the data stream in the transmitter of a transmission system. After initialization, a cumulative count of code words in the data stream is maintained by a word counter while a bit counter cyclically counts the cumulative number of data bits in the data stream. Each time the bit counter reaches a predetermined count, a representation of the present count of code words is inserted into the data stream. The received count of data words may thus be continually corrected in response to the periodically received synchronization words and thus corrected for any transmission errors that may have caused the receiver to improperly count the number of received data words. Accordingly, a transmission error induced miscount of detected data words can be corrected. Furthermore, by employing error correction techniques for encoding the transmitter count into a fixed number of digits, a receiver synchronization word decoder can examine the received data stream in a periodic manner to detect the transmitted synchronization words within the data word stream. Thus, a unique digital sequence is not required to separately identify the synchronization word from the variable bit length data words. Since a transmission error induced loss of word synchronization is inherently regained within a predetermined number of data bits, at any given instant the received accumulated count of data words differs, if at all, from the actual number of transmitted words by a determinable upper limit. In accordance with the present invention, the periodically transmitted synchronization words need only provide that much information that will, when combined with the accumulated receiver count, enable the absolute number of transmitted words to be determined.

In the embodiment of the present invention disclosed herein, a video digital transmission system samples and encodes each picture element within the active interval of each scan line in a video field to form a data stream of variable bit length code words. At the receiver, each detected and decoded variable length word is successively addressed to the next consecutive spatial position. A transmission error induced loss of word synchronization will thus result in decoded picture elements being associated with the improper spatial position. Accordingly, in order to maintain spatial synchronization, the transmitter interposes synchronization words within the data stream of variable length code words, from which the receiver continually corrects the count of received data words. Since the count of detected code words differs from the actual number of transmitted code words up to a determinable maximum within a fixed bit length sequence, synchronization words provide only that much information which is necessary to accurately provide unambiguous address information.

In the embodiment herein, each scan line has 160 horizontal positions associated therewith and is divided into five horizontal segments each having 32 positions. Following initialization at the beginning of a video field, the video signal associated with each spatial position is encoded into a variable bit length code word while a word counter cyclically counts between 1 and 32 as each word is encoded. The count of the word counter is thus representative of the relative horizontal position within a 32 position segment on a horizontal scan line. A bit counter simultaneously and cyclically counts the cumulative number of bits in the encoded digital stream. At each instant at which the bit counter reaches a predetermined count, a fixed length error-correction-encoded representation of the present count of the word counter is inserted into the data stream. This inserted synchronization word is thus indicative of the relative horizontal spatial position of a selected variable bit length code word within the data stream. At the receiver, after initialization of the encoded video field is established, each successively decoded sample is addressed to the next sequential spatial position within the video field. At the receiver, a word counter counts each code word as it is decoded while a bit counter simultaneously and cyclically counts each bit in the received data stream. The data stream is directed to a synchronization word decoder when the bit counter reaches the predetermined count. The relative horizontal position indicated by the synchronization word is interpolated into an absolute spatial position by comparing it with the count of the word counter. An adjustment is made to the count of decoded words if a positional difference is indicated. Accordingly, the next successively decoded words in the data stream are addressed to the proper spatial positions.

It is a feature of the present invention to periodically transmit a synchronization word in a variable bit length word stream, which provides information for maintaining the accumulated count of received variable bit length words in synchronism with the count of transmitted variable bit length code words.

BRIEF DESCRIPTION OF THE DRAWINGS

FIGS. 2A, 2B, 2C and 2D are waveforms useful in explaining the operation of the transmitter of FIG. 1;

FIGS. 3A, 3B and 3C, when placed side by side as illustrated in FIG. 3D, are timing diagrams useful in explaining the operation of the transmitter of FIG. 1;

FIGS. 4A and 4B, when placed side by side as illustrated in FIG. 4C, form a schematic block diagram of a receiver in accordance with the present invention;

FIG. 5 illustrates the format of a stream of digits transmitted between the transmitter of FIG. 1 and the receiver of FIGS. 4A and 4B; and FIGS. 6A, 6B and 6C, when placed side by side as illustrated in FIG. 6D, are timing diagrams useful in explaining the operation of the receiver of FIGS. 4A and 4B.

DETAILED DESCRIPTION

Introduction

Figure 1:
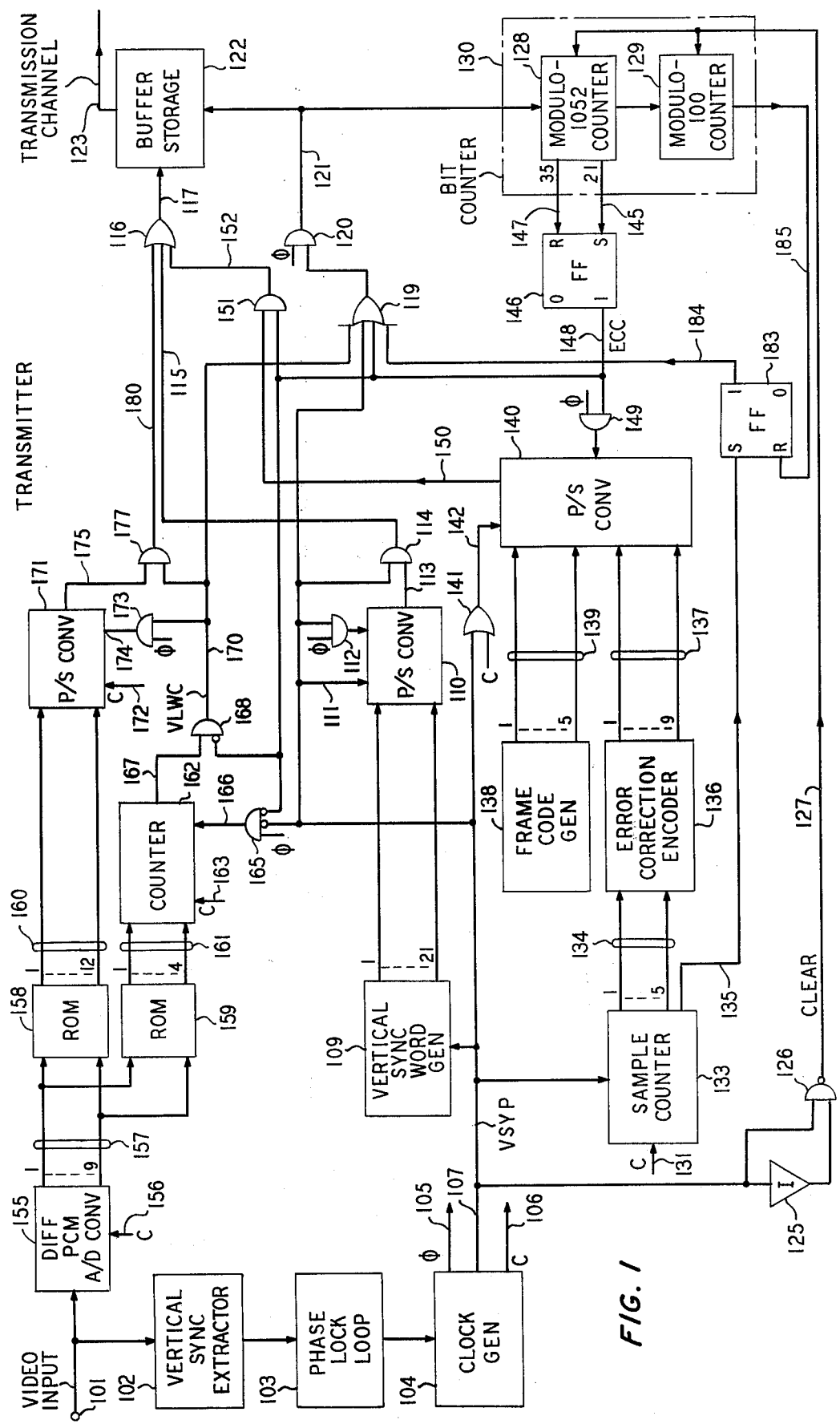
FIG. 1 is a schematic block diagram of a video digital transmitter in accordance with the present invention.

In the specific embodiment of the present invention to be described in detail hereinafter, a video telephone signal is sampled and each sample encoded using differential pulse code modulation techniques well known in the art. Each generated code word, however, rather than having a fixed number of digits has a variable code word length where the code word length is predetermined in accordance with the magnitude of the differential sample being coded. The video telephone signal comprises 133 1/2 scan lines per video field where 125 of the scan lines contain video picture information. The field rate is 60 fields/sec. An illustrative video signal is shown in FIG. 2A. Each video frame consists of two interlaced video fields. As shown in FIG. 2A, each video field is preceded by a vertical sync pulse and each video scan line is preceded by a horizontal sync pulse.

In order to convert the analog video signal into a digital format for digital transmission, the analog signal of FIG. 2A is sampled and coded. Since, however, the video signal of FIG. 2A carries information for only a portion of each of the 125 active scan lines, the video signal is sampled and encoded only during that portion of each scan line in which video signal picture information is present. Thus, as shown in FIGS. 2B and 2C, the video signal is sampled and encoded 160 times per scan line. The inactive scan line period during which no sampling is done is equivalent to 32 sampling instants. Thus each video scan line is equivalent in time to 192 sampling instants. Inasmuch as each video scan line is sampled only during the active time interval, each video field is encoded into 160 × 125 or 20,000 code words where each code word represents the video signals on a 160 × 125 spatial matrix.

Each received code word in every video field can therefore be addressed to its proper spatial location by determining its numerical count in the stream of received and detected code words. The numerical count of detected words will be in error if a transmission error has occurred during the digital transmission of the variable bit length code words. Thus, the coded picture will lose spatial synchronization. Accordingly, in accordance with the present invention, spatial synchronization is maintained by periodically transmitting with the variable bit length code words a spatial synchronization word that provides information to keep the decoded signal synchronized.

In the embodiment of the present invention to be described in detail hereinafter, a spatial synchronization word is transmitted every 1,052 bits, the latter number of bits being grouped together for digital transmission in the format of a digital frame. As will be described hereinafter, each spatial synchronization word contains error-correction-encoded information from which the spatial position of a selected variable length code word can be determined. The address of the selected code word is compared with the position to which it would otherwise be directed based upon the count of detected code words, and the latter count then updated to account for any discrepancy.

As heretofore discussed in the Background of the Invention, a discrepancy may exist between the spatial location addressed by the spatial synchronization words and the spatial location indicated by the count of detected words when a transmission error occurs in the transmitted data stream of variable bit length words. When a transmission error occurs, the receiver decoder may prematurely decide that a string of received digits is a word in the alphabet of possible transmitted words. Alternatively, the decoder may examine a string of digits longer than the transmitted variable bit word as it attempts to decipher a received digit sequence. If either event occurs, the decoder will subsequently examine the next succeeding digits to decode the next word. This next group of digits, however, will not be examined synchronously with the transmitted sequence because of the previously occurring transmission error. Therefore, further decoding inaccuracies result until the decoder resynchronizes itself with the transmitted digital data stream. Furthermore, since words may be decoded which in fact were not transmitted, or words may fail to be decoded which in fact were transmitted, the count of decoded words will not accurately represent the number of transmitted code words. Accordingly, since the decoded samples are spatially addressed in accordance with the count of decoded samples, the reconstructed video signal will be spatially unsynchronized. The spatial synchronization words which can be assumed to be received error free, correct the count of decoded words so as to spatially resynchronize the decoded video signal.

The present invention makes use of the inherent self-synchronizing characteristic of variable length codes that is disclosed in "Self-Synchronizing Sequential Coding With Low Redundancy" by P. J. Neuman, *The Bell System Technical Journal*, Vol. 50, pages 951–982, March 1971. As described in this article, a variable length decoder that has lost word synchronization with the digital data stream will automatically regain word synchronization within a limited number of data bits. It can be reasonably assumed for purposes of the specific embodiment of the present invention, that in a sequence of 1,052 bits containing a series of variable length code words 2 to 12 bits long, the difference between the number of detected code words and the actual number of transmitted words will always be less than five. Inasmuch, therefore, that the count of detected words need be corrected every 1,052 bits by at most 5, the spatial synchronization word need act only as a "fine" adjustment to the "coarse" count of decoded samples. In particular the spatial synchronization word contains only a relative horizontal position which is sufficient when combined with the count of decoded words in the video field to accurately determine a horizontal (and implicit vertical) spatial address.

In the specific embodiment of the present invention, each active video scan line comprising 160 samples is divided into five regions each having 32 samples. The spatial synchronization word, therefore, contains an error-correction-encoded representation of a number from 1 to 32. A receiver counter is reset after each 160th detected code word. Inasmuch as the actual spatial address and the address indicated by the receiver counter do not differ by more than five spatial positions, the proper address is determined by a combination of the coarse receiver count and the fine synchronization word. Specifically, since the receiver count indicates the most likely horizontal segment and the spatial synchronization word indicates the position within the segment, a jumping of segments would be readily discernible if the difference between the receiver count and synchronization word count would be more than five.

The operation of this addressing scheme is readily understandable by two illustrative examples. If the receiver count is 138, then the position indicated is the 10th sample in the 5th horizontal segment. Therefore, if the received spatial synchronization word is 12, the proper address must be the 12th position in the 5th segment, or equivalently, the 140th word on the same scan line. Accordingly, the receiver counter is updated to a count of 140. Similarly, if the receiver count places the address at the second position on the scan line and the synchronization word is 31, then the proper address must be the 159th code word on the previous scan line since this would be the only spatial position that would have both a synchronization word of 31 and be within five positions of the receiver count. Therefore, the receiver counter is decreased to indicate the count of 159.

Although a variable bit length encoded video signal is encoded into an equal number of code words per video field, the total number of bits required to encode each video field varies from field to field. Accordingly, either a fixed or variable number of digital frames each comprising 1,052 bits can be used to transmit each encoded video field. It has been experimentally determined that 100 digital frames having 1,052 bits each are sufficient to encode an analog video field signal. The 105,200 bits per digital field is derived by dividing the digital T2 channel rate of 6.312 megabits per second by the field rate of 60 fields per second. Therefore, in the embodiment of the present invention to be discussed in detail hereinafter, 100 digital frames are allocated for the transmission of each video field. As will be explained further hereinafter, zero value bits are used to fill digital space that remains in the allocated 100 digital frames after the 20,000th sample is encoded. The receiver, therefore, ignores these zero value bits after it decodes the final code word in the video field.

FIG. 5 illustrates a sequence of digits that comprise an encoded video field. A 21-bit code word VSYNC precedes the encoded samples data. When the decoder detects the word VSYNC in the data stream, therefore, it prepares to decode the data that follows into the analog format of a new video field. Following the 21-bit VSYNC indicator word are five framing bits and nine bits that comprise the spatial synchronization code word. The latter 14 bits form a sequence that is positionally uniform in each digital frame. The five framing bits prevent the data stream from slipping by employing techniques well known in the art. The remaining 9-bit spatial synchronization word is an (9, 5) Hamming error-correction-encoded representation of the relative 1-out-of-32 horizontal address of the code word that follows this synchronization word. Since the spatial synchronization word occupies the same bit position each digital frame, the receiver examines each received synchronization word by forming a window in the received data stream. Accordingly, a particular digital pattern is not required so that the receiver can recognize the synchronization word. Furthermore, as heretofore noted, since the 1-out-of-32 relative horizontal position is encoded using error-correction techniques, the decoded spatial synchronization word can be assumed to have been received error free.

Since the sample that follows the spatial synchronization word in digital frame No. 1 is the first video sample, the spatial synchronization word in this frame is the digital representation of 1. The digit spaces that follow the framing bits and the spatial synchronization word in frame No. 1 contain, as can be observed in FIG. 5, the variable length code words successively derived by sampling of the video signal.

As can be observed in FIG. 5, sample code words occupy 21 bits in the second digital frame. Transmission of the code words is thereupon interrupted for a 14-bit interval. The 5-bit framing sequence and the 9-bit synchronization word are then transmitted in this 14-bit interval. After the 14-bit sequence the code word that was interrupted is completed. As is illustrated in FIG. 5, therefore, four bits of sample No. 254 precede (94th code word, 2nd scan line) the framing bits and the remaining two bits of that sample follow the 14-bit sequence. In this illustration, sample No. 255 is the first complete code word that follows the spatial synchronization word in the second digital frame. Since the 255th sample is equivalent to the 95th sample on the second scan line or equivalently the 31st sample code word in the third 32-bit segment, the spatial synchronization word in this second digital frame will be the error-correction-encoded digital representation of 31.

After the 20,000 code is transmitted, indicating the end of the video field, zero value stuffing bits are transmitted until 100 digital frames or 105,200 bits have been transmitted. A 21-bit code word VSYNC thereupon commences the transmission of the next digitally encoded video field.

TRANSMITTER

Figure 3A:
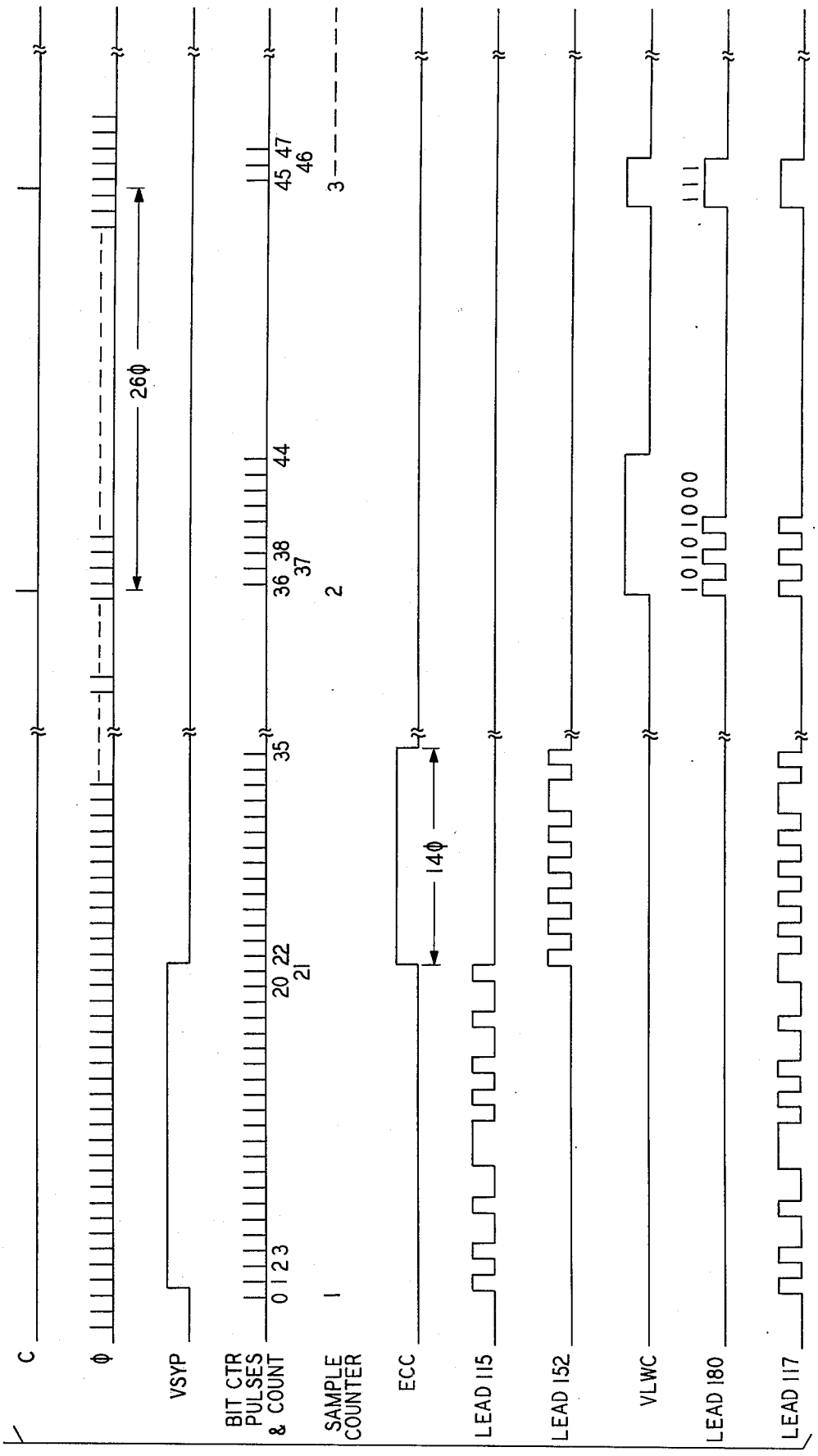
Figure 3B:
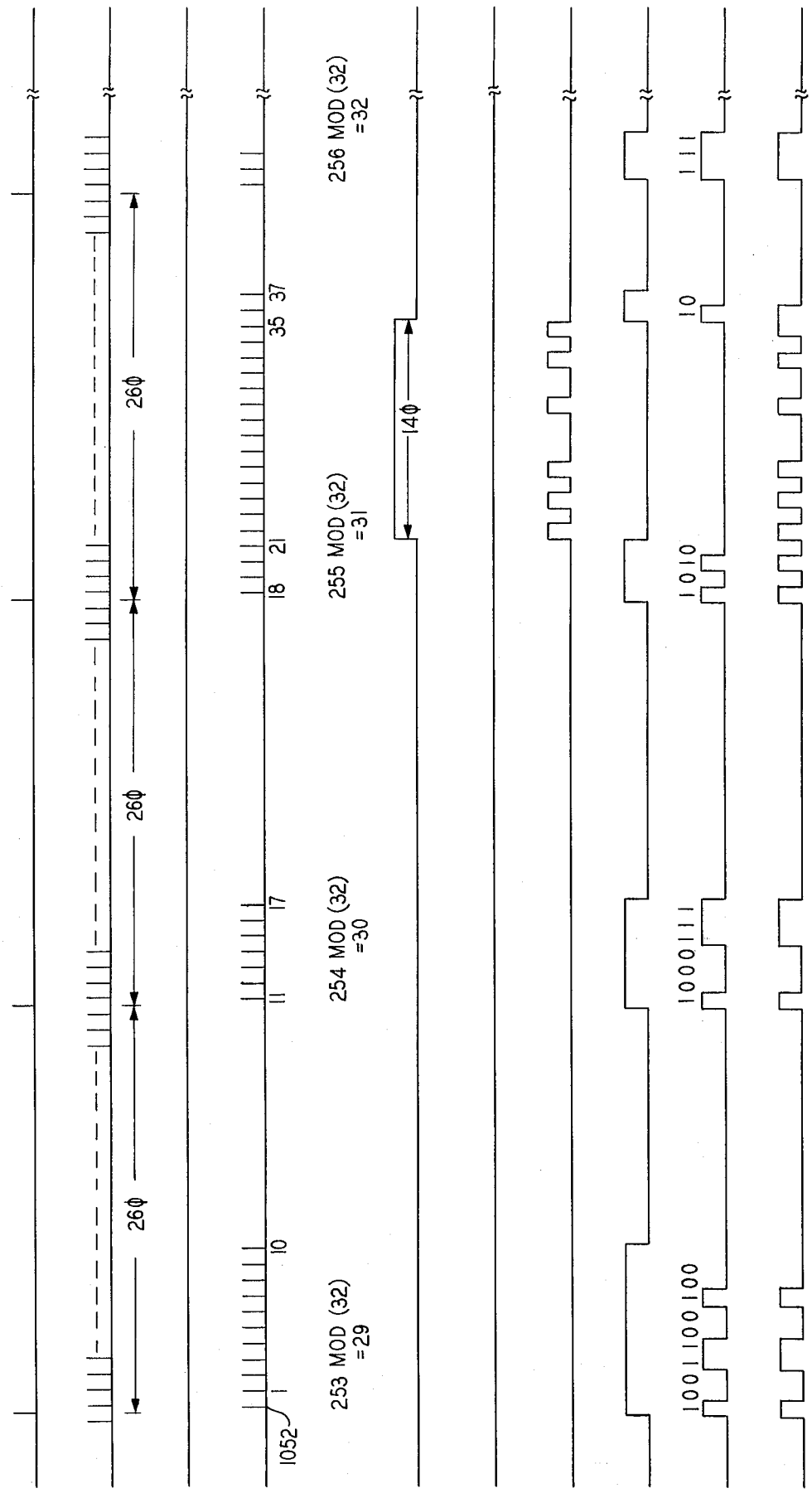

The transmitter portion of the transmission system embodying the present invention is illustrated in FIG. 1. A timing diagram illustrating the coding procedure, the synchronization technique and the timing interaction of the various components in FIG. 1 is illustrated in FIGS. 3A, 3B and 3C when placed side-by-side as shown in FIG. 3D. FIGS. 3A, 3B and 3C will be referred to collectively hereinafter as FIG. 3. The operation of the transmitter in FIG. 1 will be described in detail in conjunction with the various diagrams illustrated in FIG. 3.

The analog video input signal to be encoded using variable length coding techniques for transmission over a digital facility is applied to a video input terminal 101. Terminal 101 is connected to a vertical sync extractor 102, the output of the latter being connected to a phase-lock loop 103. The output of phase-lock loop 103 is connected to a clock generator 104. As will be described in detail hereinafter, clock generator 104 provides the timing mechanism for the transmitter.

Vertical sync extractor 102 can be one of a plurality of well-known circuits that detect a vertical sync pulse in a video signal. A pulse is produced at the output of vertical sync extractor 102 in response to each vertical sync pulse in the video signal at terminal 101. The phase-lock loop 103, which is a circuit well known in the art, provides an adjustment mechanism between clock generator 104 and the video signal. Clock generator 104 produces a pulse signal VSYP on lead 107 in response to each vertical sync pulse extracted by the vertical sync extractor 102. Phase-lock loop 103, therefore, maintains clock generator 104 in synchronism with the video signal at input terminal 101. FIG. 2D illustrates a VSYP pulse generated in response to the vertical sync pulse of the video signal.

With reference again to FIG. 1, clock generator 104 generates on lead 106 clock pulses C which control the rate at which the video input signal at terminal 101 is sampled. As can be observed in FIG. 2C and, as described hereinafter, the video signal is sampled only during those portions of each video scan line in which active video signal information is present. As illustrated in FIG. 2C, therefore, 160 C clock pulses are generated each video scan line.

Clock generator 104 also generates clock pulses $\phi$ on an output lead 105 which control the rate at which each bit of information is generated as each sample is encoded. Clock generator 104 generates a continuous stream of $\phi$ clock pulses at a rate that is determined so that 26 $\phi$ pulses can be generated between each C clock pulse. In the embodiment herein C has the rate of 1.4688 megapulses per second and $\phi$ has the rate of 38.1888 megapulses per second. As illustrated in the $\phi$ and C timing diagrams in FIG. 3, 26 $\phi$ pulses are produced between successive C clock pulses, the $\phi$ pulse stream being out of phase with the C clock pulse stream by a ½ $\phi$ interval.

As will be described hereinafter, a digital indicator word is generated and transmitted to the receiver in response to each vertical sync pulse detected by vertical sync extractor 102. Lead 107 of clock generator 104 is connected to a vertical sync word generator 109. Vertical sync word generator 109 has 21 parallel output leads which are connected to the input terminals of a parallel-to-serial converter 110. The VSYP designated timing diagram of FIG. 3 illustrates the pulse signal on output lead 107 of clock generator 104. When vertical sync extractor 102 detects a vertical synchronization pulse in the video signal at input terminal 101, line 107 is energized for a period of time equal to 21 $\phi$ clock pulses. Vertical sync word generator 109 generates a 21-bit "Barkar" code word VSYNC on its parallel output leads in response to the energized VSYP signal applied thereto. The 21-bit VSYNC word is loaded into the parallel-to-serial converter 110 in response to the energized signal VSYP applied to its loading input 111.

The $\phi$ output lead 105 of clock generator 104 is connected to a first input of AND gate 112. The VSYP output lead 107 is connected to a second input of AND gate 112. The output of AND gate 112 is connected to parallel-to-serial converter 110 to control the rate at which the applied parallel data is read out in serial form. Therefore, when the VSYP signal on lead 107 of clock generator 104 is energized, the 21-bit VSNYC word is loaded into parallel-to-serial converter 110 and read out in serial format in response to the $\phi$ pulses that are gated through AND gate 112. The signal that appears on output lead 113 of parallel-to-serial converter 110 during the interval in which the VSYP output lead 107 is energized is therefore the 21-bit binary VSYNC code word.

The output terminal 113 of parallel-to-serial converter 110 is applied to a first input of AND gate 114. The VSYP output lead 107 of clock generator 104 is connected to a second input of AND gate 114. A digital signal appears on lead 115 only during the 21 $\phi$ bit interval in which lead 107 is energized. During this interval, therefore, the serial binary representation of VSYNC is present on line 115. The "lead 115" timing diagram of FIG. 3 illustrates a possible VSYNC code word that would be present on lead 115 of AND gate 114.

Lead 115 of AND gate 114 is connected to one of three inputs of OR gate 116. It can be assumed for present purposes that the other two inputs of OR gate 116 are deenergized during the 21 $\phi$ bit interval in which the code word VSYNC is present on lead 115. The data that appears on output lead 117 of OR gate 116 during this 21 $\phi$ bit interval is therefore the VSYNC code word. The "lead 117" timing diagram in FIG. 3 illustrates the signal appearing on this lead.

The output lead 107 of clock generator 104 is also connected to an input of an OR gate 119. The output of OR gate 119 is connected to a first input of AND gate 120. The $\phi$ output lead 105 of clock generator 104 is connected to a second input of AND gate 120. During the 21 $\phi$ bit interval in which lead 107 of clock generator 104 is energized, 21 $\phi$ pulses are gated through AND gate 120 to its output lead 121. Output lead 121 of AND gate 120 is connected to the gating input of a buffer storage 122. Output lead 117 of OR gate 116 is connected to the input of a buffer storage 122. The binary levels present on the input of buffer storage 122 at the instants at which each $\phi$ pulse is applied to the gating input of the buffer storage 122 are entered into successive buffer storage locations. The 21 bits of the VSYNC word present on lead 117 are therefore read into buffer storage 122 in response to the 21 $\phi$ clock pulses on lead 121. All the data read into buffer storage 122 over lead 117 is read out over transmission channel 123 at a rate typically lower than the $\phi$ rate at which each data bit is entered.

Output lead 107 of clock generator 104 is connected to an inverter 125 and to a first input of a NAND gate 126. The output lead of inverter 125 is connected to a second input of NAND gate 126. Since inverter 125 has an inherent small delay, a negative pulse is generated on the output lead 127 of NAND gate 126 for the time interval between the instant lead 107 is energized and the instant at which the output of inverter 125 is deenergized. The output lead 127 of NAND gate 126 is connected to the clear inputs of modulo-1052 counter 128 and modulo-100 counter 129. Counters 128 and 129 are connected in tandem to form a 105,200-bit counter 130. Therefore, at the beginning of each video field the count of bit counter 130 is set to zero.

The output lead 121 of AND gate 120 is connected to the count input of modulo-1052 counter 128. Each $\phi$ pulse gated through AND gate 120 thereby increases the count of modulo-1052 counter 128, and thus bit counter 130, by the count of one. The 21 $\phi$ pulses that are gated through AND gate 120 during the interval in which output lead 107 of clock generator 104 is energized thereby to increase the count of modulo-1052 counter 128 and bit counter 130 to the count of 21.

The "Bit Counter Pulses and Count" diagram in FIG. 3 illustrates the $\phi$ pulses that are gated through AND gate 120 to bit counter 130 and buffer storage 122. The subtended numerical designation in this diagram is representative of the count of modulo-1052 counter 128 as each pulse is applied thereto.

As heretofore discussed in the Introduction section, a framing word and a vertical synchronization word are transmitted in the 22nd through 35th positions in each digital frame. The vertical synchronization word contains the relative horizontal position of the code word to follow in the digital stream. The apparatus that generates these digital words is described hereinbelow.

The VSYP lead 107 of clock generator 104 is connected to a sample counter 133. When lead 107 is energized, sample counter 133 is set to 1. Sample counter 133 increases in count in response to each C clock pulse applied to count input terminal 131 over lead 106. The output of sample counter 133, on five parallel output leads 134, is a five bit modulo-32 representation of the count of the sample about to be encoded. When sample counter 133 determines that the final 20,000th sample in the video field has been encoded, a pulse is produced on output lead 135. The "Sample Counter" diagram in FIG. 3 illustrates the count of sample counter 133 at each C clock pulse instant.

Output leads 134 of sample counter 133 are connected to an error correction encoder 136. Error correction encoder 136 generates on nine parallel output leads 137 a (9, 5) Hamming code word which is single error correcting. The Hamming (9, 5) code is easily derived from the well-known Hamming (15, 11) code by using code shortening techniques well known to those skilled in the art. A plurality of well-known coder configurations can be employed as error correction encoder 136. An example of an encoder that can be used as encoder 136 is illustrated in FIG. 5.05 on page 125 of *Algebraic Coding Theory*, E. K. Berlekamp, McGraw-Hill Book Co., 1968. If this encoder is employed, output leads 134 of sample counter 133 would be connected to a parallel-to-serial converter. Similarly, the outputs of this encoder would be connected to a parallel-to-serial converter before being applied to leads 137. A frame code generator 138 generates on five parallel output leads 139 the five digit framing sequences to be transmitted each digital frame in the 22nd through the 25th bit positions.

Leads 137 and 139 are connected to the input terminals of a parallel-to-serial converter 140. Lead 107 of clock generator 104 is connected to a first input of an OR gate 141. Output lead 106 of clock generator 104 is connected to a second input of OR gate 141. The output of OR gate 141 is connected to a load input 142 of parallel-to-serial converter 140. The load input 142 is initially energized therefore when terminal 107 of clock generator 104 is energized. The nine digit error-correction-encoded word on leads 137 and the five digit framing code word on leads 139 are thereupon loaded into parallel-to-serial converter 140. Since the energizing signal on lead 107 sets sample counter 133 to 1, the nine digit output of error correction encoder 136 on leads 137 is an error-correction-encoded Hamming code representation of the number one.

Output lead 145 of modulo-1052 counter 128 is connected to the set input of flip-flop 146. Output terminal 147 of modulo-1052 counter 128 is connected to the reset input of flip-flop 146. When modulo-1052 counter 128 reaches the count of 21, a pulse is produced on lead 145. This pulse on lead 145 sets the previously reset flip-flop 146 so as to energize the ECC output on lead 148 of flip-flop 146.

Lead 148 from flip-flop 146 is connected to a first input of AND gate 149. The $\phi$ lead 105 of clock generator 104 is connected to a second input of AND gate 149. The output of AND gate 149 is connected to parallel-to-serial serial converter 140. As each $\phi$ pulse is gated through AND gate 149, the digits loaded into parallel-to-serial converter 140 on the 14 parallel leads 137 and 139 are successively outputted in serial format over lead 150. Output lead 150 of parallel-to-serial converter 140 is connected to a first input of AND gate 151. The ECC lead 148 of flip-flop 146 is connected to a second input of AND gate 151. A non-zero signal is present on output lead 152 of AND gate 151 only during that interval in which ECC lead 148 is energized.

The ECC output lead 148 of flip-flop 146 is connected to an input of OR gate 119. The output of OR gate 119 is thereupon also energized when ECC lead 148 is energized. Thus, after ECC lead 148 is energized, the subsequent φ pulses are simultaneously gated through AND gates 149 and 120. As aforenoted, each pulse gated through AND gate 120 causes buffer storage 122 to read in the digit present on lead 117 and to increase the count of bit counter 130 by one. Accordingly, since each φ pulse gated through AND gate 149 causes a digit to be read out of parallel-to-serial converter 140 and to appear on leads 150, 152 and 117, the digits outputted by parallel-to-serial converter 140 are read into buffer storage 122 at each φ pulse instant after ECC lead 148 is energized. Following 14 φ pulse intervals during which the five-digit framing word and the nine-digit spatial synchronization word are read into buffer storage 122, and the count of modulo-1052 counter 128 increases to 35, a pulse is produced on lead 147 of modulo-1052 counter 128 to reset flip-flop 146. Thus, after the 14-bit sequence is inputted to the buffer storage from parallel-to-serial converter 140, the ECC output of flip-flop 146 is deenergized thereby inhibiting the φ pulse stream from being gated through AND gate 149 and also inhibiting an output on lead 152. As illustrated in the "ECC" timing diagram in FIG. 3, ECC lead 148 is energized for the 14-bit interval that follows the 21st φ pulse gated through AND gate 120 and lasts until after the 35th φ pulse is gated through AND gate 120. Therefore, as illustrated in the "lead 152" timing diagram of FIG. 3, the data bits that are present on lead 152 during this interval represent the 5-bit framing digit sequence and the 9-bit spatial synchronization word. This data sequence therefore appears on lead 117 as is illustrated in the "lead 117" timing diagram of FIG. 3. As can be noted in this timing diagram, the 21-bit VSYNC data word and the 14-bit framing word and spatial synchronization word sequence are entered into buffer storage 122 via lead 117 prior to the occurrence in the video field of the initial C clock pulse on lead 106.

As will be described hereinafter, the 5-bit framing word and a 9-bit spatial synchronization word are entered into buffer storage 122 every 1052 bit digital frame in the 22nd through 35th bit positions that is determined by the count of modulo-1052 counter 128. The other bit positions in each digital frame contain the variable bit length code words which are entered into the digital data stream on lead 117 in a manner to be described hereinafter.

Video input terminal 101 is connected to a differential PCM analog-to-digital converter 155. C clock lead 106 of clock generator 104 is connected to terminal 156 of the differential PCM analog-to-digital converter 155. In response to each clock C pulse on terminal 156 analog-to-digital converter 155 encodes the analog difference between the input signal on terminal 101 at that instant, and the analog representation of the digitally encoded signal at the previous sampling instant. Differential PCM analog-to-digital converter 155 can be any one of a plurality of converters well known in the art as, for example, the coder disclosed in U.S. Pat. No. 3,609,552, issued Sept. 28, 1971 to J. O. Limb. Converter 155 produces on output leads 157 a 9-bit parallel digital representation of the difference signal, one bit in the 9-bit code word being representative of the sign of the difference signal. Leads 157 are connected to the input terminals of a read-only memory 158 and the input terminals of a read-only memory 159. Read-only memories are well known in the art for converting an applied digital input word into output digital words based upon truth-table "programming."

Read-only memory 158 has 12 parallel output leads 160. Each 9-bit input code word applied to read-only memory is therefore converted to a 12-bit code word. However, in the particular variable length code word employed in the specific embodiment of the present invention described herein the number of significant digits varies from two to twelve, where the number of significant digits is determined by the specific code word on leads 157. Accordingly, as will be explained hereinbelow, only the significant digits on output leads 160 will be entered into buffer storage 122 for transmission over transmission channel 123.

Since the number of significant digits in the code word on leads 160 is determined from the code word on leads 157, read-only memory 159 generates in response to the applied code word on leads 157 a coded representation of the number of significant digits in the 12-bit code word on leads 160. The 4-bit digital representation of a number two to twelve on output leads 161 of read-only memory 159 is loaded into a counter 162 in response to the C clock pulse applied to counter 162 on terminal 163. Output lead 107 of clock generator 104 is connected to a negate input of an AND gate 165. The output lead 148 of flip-flop 146 is also connected to a negate input of AND gate 165. The φ output lead 105 of clock generator 104 is connected to a third input of AND gate 165. A φ pulse is therefore gated through AND gate 165 onto lead 166 at those φ clock instants at which neither the VSYP signal on lead 107 or the ECC signal on lead 148 is energized. As each φ pulse is gated through AND gate 165 the count of counter 162 is increased by one. After the digital representation on leads 161 is loaded into counter 162 at the C clock pulse instant and the initial φ pulse is gated through AND gate 165, output lead 167 is energized. Output lead 167 is connected to a first input of AND gate 168. Output lead 148 of flip-flop 146 is connected to a negate input of AND gate 168. An energized signal VLWC therefore appears on output lead 170 of AND gate 168 only during that interval in which output lead 167 of counter 162 is energized and the output lead 148 of flip-flop 146 is deenergized.

Output lead 167 of counter 162 remains energized for as long as the number of φ pulses gated through AND gate 165 has not exceeded the number loaded into counter 162 on leads 161. When the number of φ pulses gated to counter 162 reaches the loaded count, output lead 167 is deenergized. Lead 167 is therefore energized for a φ pulse interval equal to the number of significant digits in the 12-bit code word on leads 160. Therefore, assuming for the present purposes that the output lead 148 of flip-flop 146 is deenergized, then the output lead 170 of AND gate 168 remains energized for an equivalent interval of time.

Output leads 160 of read-only memory 158 are connected to the input terminal of a parallel-to-serial converter 171. Parallel-to-serial converter 171 is loaded in response to the C clock pulses, generated on output lead 106 of clock generator 104, that are applied to the loading terminal 172. The output lead 170 of AND gate 168 is connected to a first input of AND gate 173. The φ output lead 105 of clock generator 104 is connected to a second input of AND gate 173. The output lead of AND gate 173 is connected to a read-out input terminal 171 of parallel-to-serial converter 171. As φ pulses are gated through AND gate 173 to read-out input terminal 174 the digits loaded in parallel-to-serial converter 171 on the 12 parallel leads 160 are successively outputted in serial format on output lead 175. Accordingly, each φ pulse gated through AND gate 173 causes one digit to be read-out of parallel-to-serial converter 171. Output lead 175 of parallel-to-serial converter 171 is connected to a first input of AND gate 177. Output lead 170 of AND gate 168 is connected to a second input of AND gate 177. Output lead 180 of AND gate 177 is connected to an input of OR gate 116.

Since lead 170 remains energized for a φ pulse interval equal to the number of significant digits in the code word loaded into parallel-to-serial converter 171, the number of φ pulses gated through AND gate 173 is equivalently equal to the number of significant digits in that code word. The digits, therefore, that are outputted by parallel-to-serial converter 171 over lead 175 and gated through AND gate 177 to lead 180 are therefore the significant digits in the code word generated by read-only memory 158.

Output lead 170 of AND gate 168 is connected to OR gate 119. When output lead 170 is energized, therefore, φ pulses are gated through AND gate 120 to buffer storage 122 and modulo-1052 counter 128. Each digit outputted by parallel-to-serial converter 171 and gated through AND gate 177 and OR gate 116 is therefore entered into buffer storage 122 while simultaneously increasing the count of modulo-1052 counter 128 by one. As can be observed in the "VLWC" timing diagram of FIG. 3, the lead 170 is shown for illustrative purposes, as being energized for eight φ pulse instants following the initial C clock pulse. Therefore, as shown in the "Bit Counter Pulses and Count" diagram of FIG. 3, eight φ pulses are applied to modulo-1052 counter 128 which increases its count by eight. Similarly, as can be noted on the "lead 180" timing diagram of FIG. 3, eight binary pulses appear on lead 180 during this period. These same eight pulses are gated through OR gate 116 and entered into buffer storage 122 as can be noted in the "lead 117" timing diagram of FIG. 3.

As heretofore noted, each C clock pulse over terminal lead 106 of clock generator 104 increases the count of sample counter 133 by 1. Therefore, this first C clock pulse following the vertical sync detection increases the count of sample counter 133 to two. Error correction encoder 136 therefore generates a 9-bit error-correction-encoded representation of the number two which is loaded with the four framing bits on leads 139 into parallel-to-serial converter 140 in response to the C clock pulse gated through OR gate 141. Since, however, the lead 148 of flip-flop 146 is deenergized, no φ pulses are gated through AND gate 149 to parallel-to-serial converter 140 and, therefore, no pulses are outputted by parallel-to-serial converter 140. Output lead 152 of AND gate 151 thus remains deenergized.

As illustrated in FIG. 3, the variable length code word at the next C clock pulse instant is three bits long, causing the count of bit counter 130 to increase by three while three data bits are read into buffer storage 122. As can be observed in the "sample counter" diagram of FIG. 3, the count of sample counter 133 increases to three at this C clock pulse instant.

With reference to FIG. 1 again, when the count of modulo-1052 counter 128 reaches 1,052, a pulse is produced which increases the count of modulo-100 counter 129 by one and resets the count of modulo-1052 counter 128 to zero. After 21 data bits are outputted by parallel-to-serial converter 171 and gated through OR gate 116 to buffer storage 122, which increases the count of modulo-1052 counter 128 to 21, a pulse is produced on output lead 145 of modulo-1052 counter 128. This pulse sets flip-flop 146 which in turn energizes output lead 148. When output lead 148 of flip-flop 146 is energized, no further pulses are gated through AND gate 165 to terminal 166 of counter 162 and output lead 170 of AND gate 168 is deenergized. Therefore, no further φ pulses are gated through AND gate 173 to read-out input terminal 174 of parallel-to-serial converter 171. The data output from parallel-to-serial converter 171 is thus halted while output lead 148 of flip-flop 146 is energized. Accordingly, transmission of the significant digits in the code word loaded into parallel-to-serial converter 171 as determined by the count loaded into counter 162, is intercepted while the 5-bit framing sequence and the 9-bit spatial synchronization word is transmitted.

The 14-bit sequence is generated in a manner similar to that heretofore noted in the discussion of how the initial 14-bit sequence is generated. Accordingly, when output lead 148 of flip-flop 146 is energized, φ pulses are gated through AND gate 149 to the parallel-to-serial converter 140. The 5-bit framing code sequence and the 9-digit spatial synchronization word that have been loaded into parallel-to-serial converter 140 at the previous C clock pulse instant is therefore outputted by parallel-to-serial converter 140 and gated through AND gate 151 and OR gate 116 to buffer storage 122. Since the energized output lead 148 of flip-flop 146 energizes the output of OR gate 119, φ pulses continue to be gated through AND gate 120 to buffer storage 122 and modulo-1052 counter 128. Thus, the five framing bits and the 9 bits comprising the spatial synchronization word that successively appear on lead 117 are read into buffer storage 122. When the 14th bit in the sequence is read into buffer storage 122 the count of modulo-1052 counter 128 reaches 35. A pulse is produced on the reset input lead of flip-flop 146 thereby deenergizing output lead 148. Thereupon φ pulses are gated through AND gate 165 to counter 162. If output lead 167 was energized when the count at modulo-1052 counter reached 14, indicating that not all significant digits had been outputted by parallel-to-serial converter 171, leads 167 and 170 will again be energized. φ pulses are therefore gated through AND gate 173 until parallel-to-serial converter 171 is emptied of the remainder of significant digits in the code word that had its transmission interrupted.

With reference to FIG. 3, when the 254th C clock pulse is generated on lead 106, the count of sample counter 133 increases to 255 modulo(32), or equivalently 31. At that C clock pulse instant a code word having six significant digits is assumed developed on output leads 160 of read-only memory 158. When four of those six digits however are gated through AND gate 177 and OR gate 116, the count of modulo-1052 counter 128 reaches 21. Following the 21st bit, as can be observed in the "ECC" timing diagram, output lead 148 of flip-flop 146 is energized for a 14-bit interval. In this 14-bit interval, five framing bits and the 9-bit spatial synchronization word are outputted by parallel-to-serial converter 140 and gated through AND gate 151 and OR gate 116 to buffer storage 122. Accordingly the spatial synchronization word is a 9-bit error correction encoded digital representation of the number 31. Following the 14-bit sequence the remaining two bits of the 254th sample code word are gated through parallel-to-serial converter 171, AND gate 177 and OR gate 116 to buffer storage 122, as can be noted in the "VLWC," "Lead 180" and "Lead 117" timing diagrams in FIG. 3.

With reference again to FIG. 1, following the generation on lead 106 of the last C clock pulse in the video field and the generation of the coded representation of the corresponding code word, a pulse is produced by sample counter 133 on its end-of-picture lead 135. Flip-flop 183 is thereupon set to energize its output lead 184. Output lead 184 of flip-flop 183 is connected to a fourth input of OR gate 119. Thereafter, since the output of OR gate 119 is energized in response to the energized signal on lead 184, $\phi$ pulses are gated through AND gate 120 to buffer storage 122 and bit counter 130. Since however no digital pulses are being gated onto leads 180, 115 or 152 binary 0's are in effect being read into the buffer storage 122 over lead 117. Each stuffing 0 read into buffer storage 122 simultaneously increases the count of bit counter 130. When the count of modulo-100 counter 129 reaches 100, 100 digital frames each comprising 1,052 bits, for a total of 105,200 bits, have been entered into buffer storage 122. Accordingly, the digital space allocated for the transmission of a video field is filled. A pulse is produced on output lead 185 of modulo-100 counter 129 when the count reaches 100. Lead 185 is connected to the reset input of flip-flop 183. Therefore when modulo-100 counter 129 reaches the count of 100, flip-flop 183 is reset, thereby deenergizing lead 184. Thereafter, since no input lead of OR gate 119 is energized, no further $\phi$ pulses are gated through AND gate 120. Thus data entry into buffer storage 122 is halted. Since there are 8½ inactive video scan lines that follow the last active scan line in the video field, there is always sufficient time for the dummy 0 bits to be entered into buffer storage 122 prior to the start of the next video field.

When the next vertical sync pulse in the input signal at terminal 101 is detected by vertical sync extractor 102, output lead 107 of clock generator 104 is again energized. The coding process for this next video field then commences.

It can be noted in the "Bit Counter Pulses and Count" diagram of FIG. 3 that $\phi$ pulses are gated to bit counter 130 until the count of 105,200 is reached. As can be noted in the "Lead 117" timing diagram, stuffing 0's are loaded into buffer storage 122 over lead 117 during this interval.

Receiver

Figure 4A:
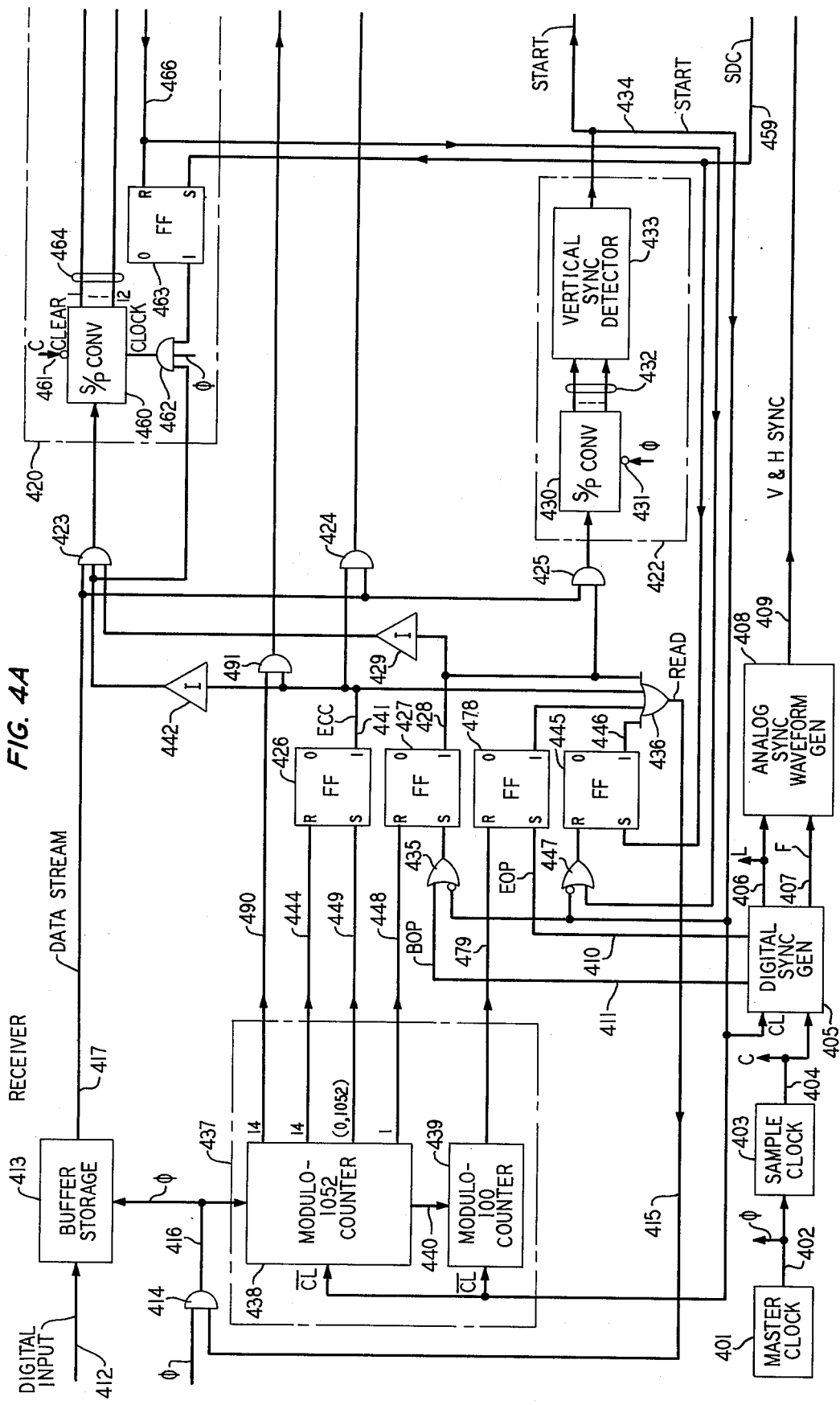

As will be described in detail hereinafter, the receiver network as illustrated in FIGS. 4A and 4B, when arranged together as illustrated in FIG. 4C, receives the transmitted digital data stream and reconstructs the analog video signal. FIGS. 4A and 4B will be hereinafter collectively referred to as FIG. 4. In accordance with the format of digital transmission employed by the transmitter heretofore described, the receiver examines the data stream until it detects the unique 21-bit VSYNC word. After the initial 5-bit framing sequence and the initial 9-bit spatial synchronization word are detected, a word decoder examines the successive digits in the data stream until a word in the alphabet of variable length code words is detected. The digital sequence that forms a word is the DPCM encoded sample of the first sample in the first scan line of the video field. Accordingly, as each succeeding code word is detected in the data stream, it is addressed to the next consecutive spatial position in the video field. After each group of 160 words are decoded, a new scan line is addressed until 125 scan lines are decoded whereupon a new video field is commenced.

As discussed in detail hereinabove, a difference may exist between the spatial position indicated by the count of detected words and the spatial position indicated by the spatial synchronization word. Accordingly, an adjustment is periodically made to the count of detected words to adjust the spatial positions to which the detected words are addressed.

As will be described in detail hereinafter, after each spatial synchronization word is decoded, the five least significant bits of a binary counter that contains the count of words decoded in the scan line are compared with the 5-bit one-out-of-32 relative horizontal scan line position encoded in the spatial synchronization word. When the spatial position indicated by the count of detected words is "behind" the position indicated by the spatial synchronization word the decoder "catches up" with the data stream by filling the intervening spatial positions between the last decoded word and the next word to be decoded with zero value data words. The data words that then follow the synchronization word in the data stream are addressed to the proper spatial location. On the other hand, when the spatial position indicated by the count of detected words is "ahead" of the position indicated by the spatial synchronization word, the count of decoded words is reduced by the difference. An equivalent number of sample code words are deleted prior to being decoded by the DPCM digital-to-analog converter so that code words subsequently decoded are properly addressed.

In the detailed discussion of the transmitter, hereinabove described, the grouping of digits in each digital frame of 1,052 bits was arbitrarily chosen so that a 21-bit VSYNC word occupied the first 21 bits in the first digital frame of each 100 frame sequences. Accordingly, in each subsequently transmitted digital frame the 5-bit framing sequence and the 9-bit spatial synchronization word occupy the 22nd through 35th bit positions. For purposes of discussion of the receiver, however, the numbering of the digits in each digital frame is chosen so that the 14-bit framing and synchronization sequence occupies the first 14-bit positions in each digital frame. Accordingly, the VSYNC vertical sync word occupies the $1,032^{nd}$ through $1,052^{nd}$ bit positions of the one hundredth digital frame in each 100 frame sequence. This change in bit numbering is effected only so that the receiver circuit may be more easily described and, as such, does not affect the operation of either the transmitter or receiver.

With reference again to FIG. 4, a master clock 401 generates $\phi$ pulses on output lead 402 at the same rate at which $\phi$ pulses are generated by clock generator 104 in FIG. 1. As will be described hereinafter, the $\phi$ clock pulses control the rate at which each data bit is read into the receiver. Lead 402 is connected to a sample clock 403. One C clock pulse is generated on output lead 404 of sample clock 403 for every 26 $\phi$ pulses generated by master clock 401. The C clock pulses generated by sample clock 403 are out-of-phase by one-half $\phi$ clock pulse period with the pulse stream on lead 402. As will be described hereinafter, the C pulse rate determines the rate each encoded word is decoded and also the length of each scan line and video field. Accordingly, master clock 401 and sample clock 403 provide the basic timing mechanisms for decoding the digital input stream and reconstructing the analog video signal.

Output lead 404 of sample clock 403 is connected to a digital sync generator 405. Digital sync generator 405 generates an L clock pulse on output lead 406 in response to every 192 C clock pulses generated by sample clock 403. As will be described hereinafter, the L clock pulse rate determines the rate at which each scan line is generated. As heretofore noted, each video scan line is encoded into 160 sample code words. However, 192 C clock pulses are allocated between each L clock pulse to account for the inactive scan line interval. Accordingly, as will be described hereinafter, code words in the incoming data stream will be decoded in response to only 160 of the 192 C clock pulses generated on lead 404 between each L clock pulse generated on lead 406.

In order to initiate the decoding of each new video field a framing clock pulse F is generated on output lead 407 of digital sync generator 405 in response to each 133½ L clock pulses generated on lead 406. Since each 100 digital frames contain information to decode 125 scan lines, digital sync generator allocates the extra 8½ L clock pulses to account for the inactive scan lines in each analog video field in which no video signal information is present. As will be described in detail hereinafter, an end-of-picture EOP pulse is generated on output lead 410 of digital sync generator 405 when the last word in the active field is decoded. Accordingly, an EOP pulse is produced on lead 410 in response to the 160th C clock pulse that follows the 125th L clock pulse after an F clock pulse. Similarly, as will be described in detail hereinafter, a beginning of-picture BOP pulse is generated on output lead 411 of digital sync generator when decoding of a video field is to be commenced.

Output lead 406 and output lead 407 of digital sync generator 405 are connected to an analog sync waveform generator 408. In response to the L clock pulses and the F clock pulses applied thereto, analog sync waveform generator 408 generates vertical and horizontal sync signals on lead 409 which are combined with the decoded analog signal to produce a reconstructed video signal.

The signal transmitted from buffer storage 122 on transmission line 123 in FIG. 1 is received on lead 412 and applied to a buffer storage network 413. The received digital data bits are stored in consecutive storage locations of buffer storage 413 from which they are successively read out in response to applied $\phi$ clock pulses. The $\phi$ pulse output lead 402 of master clock 401 is connected to a first input of an AND gate 414. A READ lead 415 is connected to a second input of AND gate 414. When READ lead 415 is energized, $\phi$ pulses are gated through AND gate 414 to lead 416. Lead 416 of AND gate 414 is connected to the clocking input of buffer storage 413. Accordingly, when READ lead 415 is energized, $\phi$ pulses are clocked to buffer storage 413. Buffer storage 413 outputs a stored digit onto data stream lead 417 in response to each $\phi$ clock pulse on lead 416. Therefore, as will be described more fully hereinafter, READ lead 415 controls the time intervals in which data is read out of buffer storage 413.

The digits outputted by buffer storage 413 in response to the $\phi$ clock pulses gated through AND gate 414 are directed to either a word decoder 420, a framing and synchronization decoder 421 or a vertical sync decoder 422. Accordingly, data stream lead 417 is connected to first inputs of AND gates 423, 424 and 425. The outputs of AND gates 423, 424 and 425 are connected, respectively, to word decoder 420, framing and synchronization decoder 421 and vertical sync decoder 422. Inasmuch as the VSYNC word, the framing and synchronization sequence and the variable length code words always occupy fixed positions in the digital frame, the digits on data stream lead 417 can be directed to the appropriate receiver decoder by energizing and deenergizing second input leads to AND gates 423, 424 and 425 which are controlled by the bit counting apparatus to be described hereinafter.

In order, however, for the decoder to appropriately direct the digits in the received data stream to the appropriate decoder, the receiver must initially synchronize itself with the format of the transmitted digital frames. Accordingly, before the decoding process can properly commence the receiver must decode a VSYNC word in the data stream to indicate that the digital representation of a video field is to follow. Once this initial synchronization is effected a VSYNC word will appear in the data stream every 105,200 bits. Therefore, the digits outputted by buffer storage 413 onto data stream lead 417 are initially gated through AND gate 425 to vertical sync decoder 422 before other decoding processes can commence. Accordingly, as will be explained in detail hereinafter, a second input to AND gate 423 is initially deenergized to prevent the data on data stream lead 417 from being gated to word decoder 420.

Flip-flops 426 and 427 control the gating of the digits on data stream lead 417 to the appropriate decoders as described hereinbelow. The high output of flip-flop 427 is connected to the second input of AND gate 425. Accordingly, when flip-flop 427 is set, lead 428 at the high output of flip-flop 427 is energized and the data on data stream lead 417 is gated through AND gate 425 to the vertical sync decoder 422. Lead 428 is also connected to an inverter 429, the output of which is connected to an input of AND gate 423. Thus, when flip-flop 427 is set, the output of inverter 429 is deenergized and the digits on data stream lead 417 are prevented from being gated through AND gate 423 to word decoder 420. Accordingly, when digits are gated into vertical sync decoder 422, they are inhibited from word decoder 420.

Vertical sync decoder 422 includes a serial-to-parallel converter 430, the input of which is connected to the output of AND gate 425. In response to 21 $\phi$ clock pulses applied to terminal 431 from $\phi$ lead 402, serial-to-parallel converter 430 converts the 21 successive serial digits gated through AND gate 425 into a parallel format on 21 parallel output leads 432. Output leads 432 are connected to vertical sync detector 433. The output of vertical sync detector 433 is START lead 434 which is initially deenergized.

START lead 434 is connected to the negate input of an OR gate 435. The output of OR gate 435 is connected to the set input of flip-flop 427. Since START lead 434 is deenergized prior to the detection of the initial VSYNC word, the output of OR gate 435 is initially energized and flip-flop 427 is initially set. Therefore, as heretofore noted, lead 428 is energized and the initial data on data stream lead 417 is gated through AND gate 425 and inhibited from AND gate 423 as desired.

Lead 428 is connected to an input of OR gate 436. The output of OR gate 436 is READ lead 415, heretofore described. Therefore, when READ lead 415 is energized, φ pulses are gated through AND gate 414 and data is outputted by buffer storage 413 onto data stream lead 417. Since, as aforenoted, output lead 428 of flip-flop 427 is energized prior to the initial detection of a VSYNC word by vertical sync detector 433, READ lead 415 is also initially energized as desired. Thus, data is initially and continually read out of buffer storage 413 onto data stream lead 417 and into serial-to-parallel converter 430. When vertical sync detector 433 detects the VSYNC word on leads 432, START lead 434 is energized and remains energized thereafter.

START lead 434 is also connected to the clear input of digital sync generator 405. When START lead 434 is energized following the detection of the initial VSYNC word, code words can thereafter be decoded. In order that the decoded signal samples be spatially synchronized the analog line and field signals must be generated coincident with the beginning of each 100 digital frame sequence. Accordingly, digital sync generator 405 commences the generation of L clock pulses and F clock pulses in response to the energization of START lead 434. An initial L clock pulse is produced on lead 406 and an initial F clock pulse is produced on lead 407 in response to the trailing edge of the C clock pulse that follows the energization of START lead 434. The subsequent scan line and field retrace times are thus determined since, as aforenoted, one L clock pulse is thereafter produced for every 192 C clock pulses generated by sample clock 403 and one F clock pulse is produced for every 133½ L clock pulses generated by digital sync generator on lead 406.

After the initial VSYNC word is decoded, the receiver is synchronized since the digital location of the subsequent framing and coding sequences, variable length code words and VSYNC words can be determined from the count of each received bit. Accordingly, the decoder to which each bit is directed is determined by its location in each digital frame of 1,052 bits on data stream lead 417. Therefore, a bit counter 437, connected to lead 416, is employed to count the data bits outputted by buffer storage 413. Bit counter 437 comprises a modulo-1052 counter 438 and a modulo-100 counter 437 connected in tandem via lead 440 to form a 105,200 bit counter. A pulse is produced on lead 440 which increases the count of modulo-100 counter 439 by one after the last bit in each digital frame when the count of modulo-1052 counter 438 reaches 1,052. Thus, after 100 digital frames of information containing the digital representation of one video field have been outputted by buffer storage 413, counter 439 reaches the count of 100. START lead 434 is connected to clear inputs of both counters 438 and 439. Therefore, prior to the initial detection of a VSYNC word, bit counter 437 remains at the count of zero. Following the detection of the VSYNC word, however, START lead 434 is energized and each subsequent φ pulse gated through AND gate 414 increases the count of bit counter 437 by one.

As aforenoted, in the detailed description of the transmitter, the digits that follow each VSYNC code word in the transmitted data stream comprise the 5-bit framing word and the 9-bit synchronization word containing the Hamming error-correction-encoded representation of 1. Accordingly, these 14 bits are directed to the framing and synchronization decoder 421 in a manner to be described hereinbelow.

Output lead 449 of counter 438 is connected to the set input of flip-flop 426. Lead 449 is initially energized when counter 438 is cleared. Similarly, counter 438 produces a pluse on lead 449 at each instant when the count reaches 1,052. Accordingly, prior to the detection of the initial VSYNC word, counter 438 is cleared and flip-flop 426 is in the set state. Thus, output lead 441, connected to the high output of flip-flop 426, is initially energized. Lead 441 is connected to a second input of AND gate 424. The digits on data stream lead 417 are thus initially gated through AND gate 424 to framing and synchronization decoder 421. As will be explained in detail hereinafter, framing and synchronization decoder 421 decodes the digital sequence gated through AND gate 424 only after the count of counter 438 reaches 14. Since, however, counter 438 remains at the count of zero prior to the initial detection of the VSYNC word, the initial digits gated through AND gate 424 prior to the detection of VSYNC by vertical sync detector 422 are not decoded.

Lead 441 is also connected to an inverter 442, the output of the latter being connected to an input of AND gate 423. Therefore, at the instants when flip-flop 426 is set, energized lead 441 prevents the digits on data stream lead 417 from being gated through AND gate 423 to word decoder 420. Lead 441 is also connected to OR gate 436. Therefore, when flip-flop 426 is in the set state, READ lead 415 is also energized.

Output lead 448 of counter 438 is connected to the reset input of flip-flop 427. A pulse is produced on lead 448 when the count of counter 438 reaches one. Accordingly, flip-flop 427 which, as aforenoted, controls the gating of the digits into the vertical sync decoder 422, is reset and lead 428 is deenergized. Thus, after the initial VSYNC word is detected and the count of counter 438 increases to one, output lead 428 of flip-flop 427 is deenergized and the data on data stream lead 417 is thereafter inhibited by AND gate 425 from vertical sync decoder 422.

Although output lead 428 of flip-flop 427 is deenergized, READ lead 415 remains energized since, as aforenoted, output lead 441 of flip-flop 426 has been initially energized. Thus, following the initial VSYNC detection, φ pulses continue to be gated through AND gate 414 to buffer storage 413 thereby maintaining the output of data bits onto data stream lead 417. Inasmuch as output lead 441 of flip-flop 426 is energized, as aforenoted, these subsequent bits are gated through AND gate 424 to framing and synchronization decoder 421. As heretofore noted, the 14 bits that follow the VSYNC word in the data stream comprise the framing and synchronization sequence. When the count of counter 438 reaches 14, such that these 14 bits have been gated through AND gate 424 to frame and synchronization decoder 421, a pluse is produced on output lead 444 of counter 438. Lead 444 is connected to the reset input of flip-flop 426. Thus, after the 14th bit of the framing and synchronization sequence has been gated into framing and synchronization decoder 421, output lead 441 of flip-flop 426 iis deenergized thereby preventing further data bits from being gated into framing and synchronization decoder 421. Since both flip-flops 426 and 427 are now reset and leads 441 and 428 are thereby deenergized, and for present purposes, the other remaining input leads of OR gate 436 can be assumed to be deenergized, READ lead 415 is now also deenergized. Therefore, following the 14-bit framing and synchronization sequence data output from buffer storage 413 is halted.

Figure 6A:
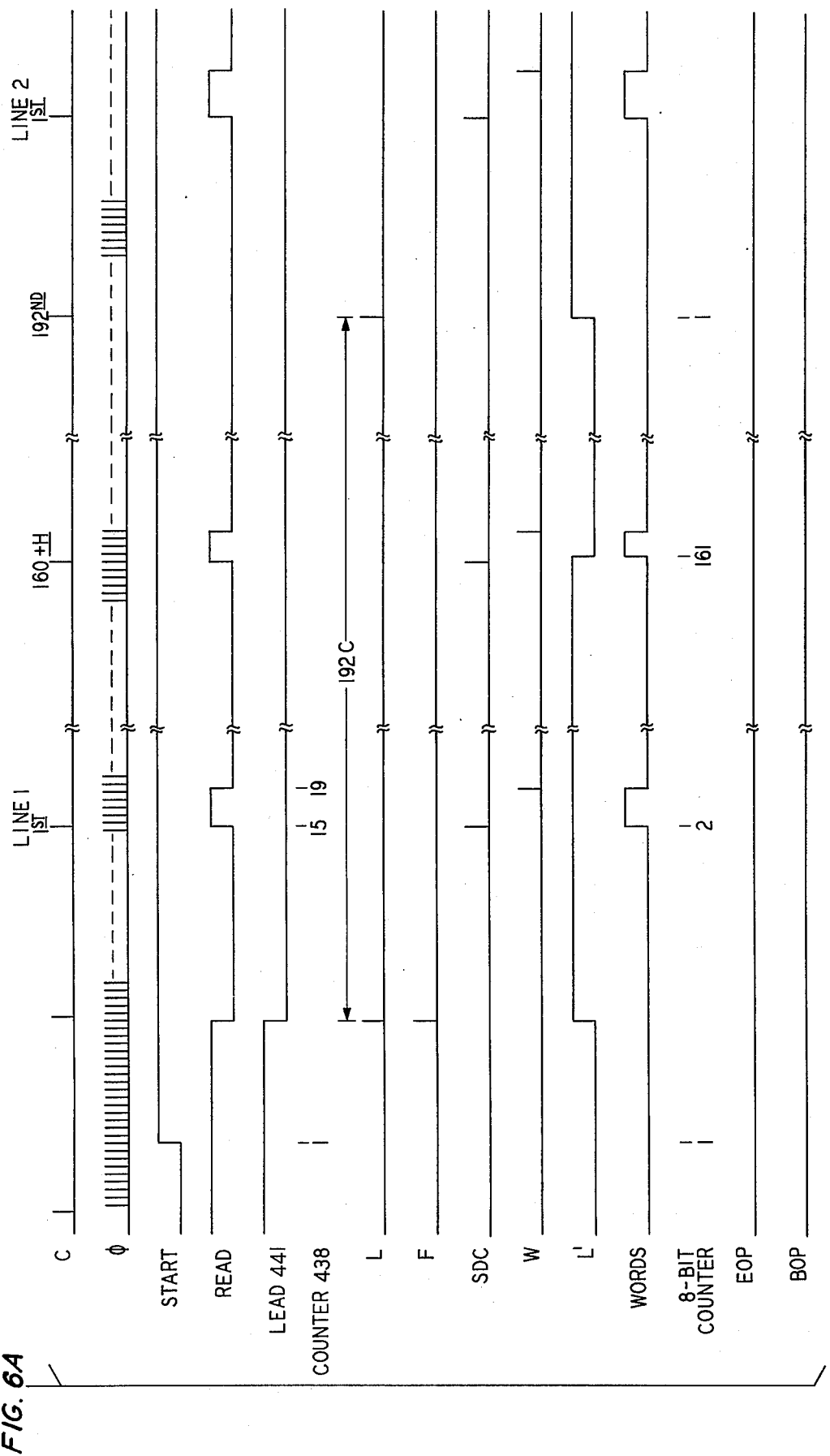

The operation of the receiver in FIG. 4 will be described in conjunction with the timing diagrams of FIGS. 6A, 6B and 6C to be referred to hereinafter as FIG. 6 collectively. As can be noted in the $\phi$ and C timing diagrams, one C pulse occurs for every 26 $\phi$ pulses. As can be noted in the "START," "READ," "Lead 441" and "counter 438" timing diagrams, READ lead 415 and lead 441 are initially energized prior to the energization of START lead 434 and remain energized for 14 $\phi$ bits beyond the instant in which start lead 415 is energized. When counter 438 reaches the count of 14, lead 415 and lead 441 are deenergized and remain deenergized until decoding of the variable length code words commences. As can be noted in the L timing diagram, the first L pulse occurs with (the trailing edge) the C pulse that follows the energization of START lead 434. Thereinafter, each L pulse occurs at 192 C pulse intervals.

The operation of framing and synchronization decoder 421, the operation of word decoder 420 will be described hereinbelow, and the operation of decoder 421 will follow thereafter.

With reference again to FIG. 4, variable length code word data bits are outputted by buffer storage 413 into word decoder 420 in response to the setting and resetting of a flip-flop 445. As will be described more fully hereinbelow, READ lead 415 is energized at fixed decoding C clock pulse time instants to permit digits to be outputted by buffer storage 413 and gated into word decoder 420. When a digit sequence is recognized as a variable length word, READ lead 415 is deenergized until the next decoding time instant.

As heretofore noted, there are 160 code positions in each scan line. Since the video signal has time periods in which no video information is present, the receiver performs a decoding operation at only that interval between L clock pulses that corresponds to the active scan line interval. Since there are 192 C clock pulses between each L clock pulse generated by digital sync generator 405, there are 32 C clock pulse instants between each L pulse in which a decoding process is not performed.

At each C clock pulse instant at which decoding is to be performed, flip-flop 445 is set so as to energize its high output lead 446. Lead 446 is connected to an input of OR gate 436. Thus, at these C clock instants READ lead 415 is energized permitting digits to be read out of buffer storage 413 onto data stream lead 417. Since flip-flops 426 and 427 are both in the reset state after the 14th bit is gated onto lead 417 which deenergizes leads 441 and 428 so that the outputs of inverters 442 and 429 are energized, the digits on data stream lead are gated through AND gate 423 into word decoder 420.

START lead 434 is connected to the negate input of an OR gate 447, the output of which is connected to the reset input of flip-flop 445. Thus, since START lead is initially deenergized, the output of OR gate 447 is energized and flip-flop 445 is initially in the reset state. Therefore, lead 446 is also initially deenergized. As will be described hereinbelow, a pulse is produced on the set input of flip-flop 445 at each C clock pulse instant in which decoding is to be performed to allow digits in buffer storage 413 to be gated into word decoder 420. A pulse is similarly produced at the reset input of flip-flop 445 after a word is decoded to deenergize lead 446 and READ lead 415.

The C clock pulse instants within the scan line interval at which decoding is performed are determined by the count of C clock pulses between each L clock pulse. As is described hereinbelow, word counter 451 counts the successive words decoded by word decoder 420 per video line from which the active line interval can be determined. In addition, as will hereinafter be fully explained in conjunction with the description of framing and synchronization decoder 421, the count of word counter 451 is compared with the decoded synchronization word to determine whether the variable length code words are being addressed to the proper spatial location.

Word counter 451 includes an 8-bit up/down counter 450 which counts each C clock instant at which decoding takes place. START lead 434 is connected to a negate input of an OR gate 452. L output lead 406 of digital sync generator 405 is connected to a second input of OR gate 452 and beginning-of-picture lead 411 is connected to a third input of OR gate 451. The output of OR gate 452 is connected to a set-to-one input of counter 450. Since START lead 434 is energized prior to the initial detection of the VSYNC word, the output of OR gate 452 is initially energized. Thus, the count of counter 450 is initially at one. As will be apparent hereinafter, the count of counter 450 will always register the horizontal scan line position of the variable length code word that is to follow the synchronization word in the data stream. C output lead 404 of sample clock 403 is connected to a first input of an AND gate 453, and L' lead 454, to be described hereinbelow, is connected to a second input of AND gate 453. The output of AND gate 453 is connected to the UP input of counter 450.

L lead 406 is connected to the set input of a flip-flop 455. As heretofore noted, an L pulse is produced on lead 406 at the trailing edge of the C clock pulse that follows the energization of START lead 434. Accordingly, flip-flop 455 is set in response to the initial L clock pulse thereby energizing L' lead 454 which is connected to the high output of flip-flop 455 and, as aforenoted, to an input of AND gate 453. Therefore, as the subsequent C clock pulses that follow each L clock pulse are gated through AND gate 453 to counter 450, the count of counter 450 successively increases by one. When the 160th C clock pulse is gated through AND gate 453 to increase its count to 161, a pulse is produced on lead 456. Lead 456 is connected to the reset input of flip-flop 455. Accordingly, after 160 C clock pulses are gated through AND gate 453, L' lead 454 is deenergized and remains deenergized until the next L clock pulse sets flip-flop 455. In addition, the count of counter 450 is set to one in response to the next L clock pulse.

As is apparent from the L, L' and "8-Bit Counter" timing diagrams of FIG. 6, L' lead 454 determines the 160 word length active scan line interval within the 192 C clock pulse interval between each L clock pulse. As will be described hereinbelow, word decoder 420 decodes the variable length data in response to the C clock pulses that occur during the period in which L' lead 454 is energized.

As heretofore noted, flip-flop 445 is set at each C clock pulse instant at which decoding takes place. L' lead 454 is connected to a first input of an AND gate 457. The C pulse output lead 404 of sample clock 403 is connected to a second input of AND gate 457. I lead 458 is connected to a negate input of AND gate 457. I lead 458, to be described hereinafter, can for present purposes be assumed to be deenergized. Accordingly, each C clock pulse generated by sample clock 403 is gated through AND gate 457 during the interval in which L' lead 454 is energized. Therefore, an SDC clock pulse appears on SDC output lead 459 of AND gate 457 at 160 of the 192 C clock pulse instants between each L clock pulse.

Lead 459 is connected to the set input of flip-flop 445. Accordingly, at each SDC pulse instant, flip-flop 445 is set and output lead 446 is energized, which thereby energizes READ lead 415. Decoding therefore takes place in response to each SDC clock pulse on lead 459. As will be described hereinbelow, a pulse is produced at the reset input of flip-flop 445 following a decoding interval. Lead 446 and thus also READ lead 415 are thereby deenergized. Flip-flop 445 then remains in the reset state until the next SDC clock pulse on lead 459.

As can be noted in the "SDC" and L' timing diagrams of FIG. 6, a pulse occurs on lead 459 at each of the C clock pulse instants during the interval in which L' lead 454 is energized.

With reference again to FIG. 4, when READ lead 415 is energized, $\phi$ pulses are gated through AND gate 414 to buffer storage 413 causing data output onto data stream lead 417. Since both flip-flops 426 and 427 are in the reset state and leads 441 and 428 are deenergized, the outputs of both inverters 442 and 429 are energized. Therefore, the digits outputted onto data stream lead 417 in response to the SDC pulses on lead 459 are gated through AND gate 423 into word decoder 420. Furthermore, since leads 441 and 428 are deenergized, AND gates 424 and 425 inhibit these same digits from framing and synchronization decoder 421 and vertical sync decoder 422, respectively.

The digits gated through AND gate 423 are applied to a serial-to-parallel converter 460. Serial-to-parallel converter 460 is cleared in response to each C clock pulse applied to its clear input 461. Each digit at the output of AND gate 423 is gated into serial-to-parallel converter 460 in response to clock pulses on its clock input lead. This clocking is achieved by gating $\phi$ pulses through an AND gate 462 to the clock input of converter 460. The $\phi$ output lead 402 of master clock 401 is connected to a first input of AND gate 462. The output of inverter 442 is connected to a second input of AND gate 462. The high output of a flip-flop 463 is connected to a third input of AND gate 462. SDC lead 459 is connected to the set input of flip-flop 463. Therefore, flip-flop 463 is set in response to each SDC pulse. Accordingly, the high output of flip-flop 463 is energized in response to each SDC pulse and, since the output of inverter 442 is also energized, $\phi$ pulses are gated through AND gate 462 to the clock input of serial-to-parallel converter 460. Each $\phi$ pulse gated through AND gate 462 thus causes a digit to be entered into serial-to-parallel converter 460. As each digit is entered into serial-to-parallel converter 460 it appears in parallel format on one of the 12 parallel output leads 463, each subsequent digit appearing on the next consecutive output lead.

Parallel output leads 464 are connected to a variable length decoder 465. Variable length decoder 465 examines the consecutive digits appearing on leads 464. When a sequence of digits is recognized as being a word within the alphabet of variable length code words, variable length decoder 465 provides a W pulse on output lead 466. Since each variable length code word may be 2 to 12 bits long, a W pulse will be produced after buffer storage 413 has entered from 2 to 12 digits into serial-to-parallel converter 460.

Lead 466 is connected to the reset input of flip-flop 463 and to a second input of OR gate 447. Therefore, when a sequence of digits is recognized as a variable length word, flip-flop 463 is reset and its high output deenergized. Further $\phi$ pulses are therefore inhibited from being gated through AND gate 462 to serial-to-parallel converter 460. Thus no further digits can be entered into serial-to-parallel converter 460. Similarly, the pulse on W lead 466 is gated through OR gate 447 to reset flip-flop 445. Output lead 446 of flip-flop 445 is thereby deenergized and READ lead 415 is deenergized. Accordingly, no further data is outputted by buffer storage 413 onto data stream lead 417 after a variable length code word is detected by variable length decoder 465. At the next SDC clock pulse instant flip-flops 445 and 463 are again set. Since the C clock pulse at this instant clears serial-to-parallel converter 460, the next subsequent digits out of buffer storage 413 are read into serial-to-parallel converter 460 until variable length decoder 465 recognizes the next variable length code word in the data stream.

Variable length decoder 465 converts each recognized variable length word into a fixed length 9-bit DPCM word on parallel leads 467. Parallel leads 467 are connected to a shift register 468. At each C clock instant the code representation on leads 467 is shifted into shift register 468 in response to the C clock pulse on clocking lead 469. Shift register 468 is a 9-rail, 5-cell register which is clocked in response to clock pulses on lead 469. Each cell of shift register 468 is connected to an input of a multiplex gate 470. In response to the digital code on parallel leads 471, multiplex gate 470 selects the cell of shift register 468 from which data will be read out will occur. Output leads 473 of multiplex gate 470 are connected to a DPCM decoder 472. The parallel code word on leads 473 is thus equal to the 9-bit data word stored in one of the cells of shift register 468. Nominally, multiplex gate 470 selects the fifth cell of shift register 468 when leads 471 are all deenergized. Accordingly, there is nominally a 5C time delay between the time at which a 9-bit code word is clocked into shift register 468 and the time this same 9-bit word is decoded by DPCM decoder 472.

As each 9-bit code word on leads 473 is clocked into DPCM decoder 472 in response to the C clock pulses on lead 474, an analog signal is reconstructed and produced on output lead 475. DPCM decoder 472 is a standard differential pulse code modulation decoder of a type well known in the art which forms an analog signal from the successive DPCM code words applied thereto. An analog signal adder 476 combines the decoded analog signal on lead 475 with the analog vertical and horizontal sync signals generated by analog signal waveform generator 408 on lead 409. A reconstructed analog video signal is thereby produced on output lead 477.

As heretofore noted, during the active line interval each C clock pulse is gated through AND gate 453 to the up input of 8-bit counter 450. Therefore, the count of counter 450 increases by one as each code word is decoded in response to the SDC clock pulses on lead 459. Since the count of counter 450 is set to one before any code word is decoded in a video line and is reset to one in response to each L clock pulse. The count of counter 450 represents the horizontal count of the data word about to be decoded by variable length decoder 465. After 160 code words have been decoded by variable length decoder 465, the count of counter 450 has reached 161. Counter 450 produces a pulse on lead 456 which rests flip-flop 455 and thereby deenergizes L' lead 454. The next 32 C clock pulses are thus inhibited from the up input of counter 450 and from the set input of flip-flop 445. Therefore, no data is read out of buffer storage 413 and the count of counter 450 remains at 161. Each of these next 32 C clock pulses, however, continues to shift the data from shift register 468 into DPCM decoder 472. Since serial-to-parallel converter 460 is cleared at each of these 32 C clock pulses, 32 zero value words are successively clocked into shift register 468 to be decoded by DPCM decoder 472 to account for the inactive video line interval. The next L clock pulse, which is coincident with the 32nd C clock pulse in this inactive line interval, is clocked through OR gate 452 to set counter 450 to one. Similarly, this next L pulse sets flip-flop 455 and energizes L' lead 454. Accordingly, the next subsequent C clock pulses are gated through AND gate 457 to produce SDC pulses on lead 459. These next C clock pulses are also gated through AND gate 453 to the up input of counter 450. At each of these next 160 C clock pulse instants, data is outputted by buffer storage 413 and a code word is decoded in the manner heretofore discussed. Inasmuch as the first 160 decoded words were directed to the first video line in the video field being decoded, these next 160 code words are directed to the second video line in the video field.

Each data bit gated through buffer storage 413 into word decoder 420 increases the count of bit counter 437 by one. When the count of counter 438 reaches 1,052, a pulse is produced on lead 449 which sets flip-flop 426 thereby energizing ECC lead 441. Since the next data in the stream is the framing and synchronization word sequence, the data stream is directed to framing and synchronization decoder 421 and inhibited from word decoder 420. Accordingly, since the output of inverter 442 is deenergized when ECC lead 441 is energized, no further $\phi$ pulses are gated through AND gate 462 to serial-to-parallel converter 460 and no further data bits are gated through AND gate 423 to word decoder 420. READ lead 415, however, remains energized and since lead 441 is energized the next 14 bits gated through buffer storage 413 onto data stream lead 417 are gated through AND gate 424 to framing and synchronization decoder 421.

As will be discussed hereinafter, this 14-bit sequence which, as aforenoted, comprises the framing and synchronization sequence, is decoded by framing and synchronization decoder 421. As will be discussed hereinbelow, the encoded synchronization word is compared with the horizontal position indicated by counter 450. An adjustment is appropriately made to spatially resynchronize the decoded signal if a discrepancy exists between the horizontal position indicated by the spatial synchronization word and the horizontal position indicated by the count of counter 450.

Following the 14-bit framing and synchronization sequence a pulse is produced by counter 438 on output lead 444. Flip-flop 426 is thereby reset and ECC lead 441 is deenergized. Since flip-flop 445 remains set during the 14-bit interval, READ lead 415 remains energized following the framing and synchronization sequence so that the next data bits on data stream lead 417 are again redirected into word decoder 421. Variable length decoder 465 thus examines the digits entered into serial-to-parallel converter 460 prior to the 14-bit framing and synchronization sequence in a continuum with the digits entered into serial-to-parallel converter 460 after the 14-bit sequence until a variable length word is detected.

As can be observed in the "C," "READ," "SDC," W, L' and "Words" timing diagrams in FIG. 6, an SDC pulse is produced at each C clock pulse instant within the interval in which L' lead is energized. READ lead 415 is energized between each SDC pulse and each W pulse, between which pulses, data bits are entered into word decoder 420. As can be noted in the "8-bit counter" timing diagram, the count of counter 450 increases by one at each C clock pulse within the interval in which L' lead 454 is energized.

As can be noted in the "counter 438," "READ," "Lead 441," and "Words" timing diagrams, lead 441 is energized and the stream of data bits entered into word decoder 421 is interrupted when the count of 1052-counter 438 reaches 1,052. As noted, lead 441 remains energized for the next 14 $\phi$ interval. When the count of 1052-counter 438 reaches 14, lead 441 is deenergized. Since, however, flip-flop 445 remains set, thereby maintaining READ lead 415 energized, the remaining digits in the word that was commenced prior to the 14-bit sequence are gated into word decoder 420. A W pulse is produced when variable length decoder 465 determines that the combination of the digits transmitted before the 14-bit sequence and the digits transmitted after the 14-bit sequence form a word.

With reference again to FIG. 4, a variable length code word is decoded as each SDC pulse is generated on lead 459. Each decoded word is addressed to the next consecutive spatial position in the video field. When the 160th code word in the 125th video line is decoded, digital sync generator 405 produces an end-of-picture EOP pulse on lead 410. Lead 410 is connected to the set input of flip-flop 478. The high output of flip-flop 478 is connected to an input OR gate 436. Output lead 479 of counter 439 is connected to the reset input of flip-flop 478. Output lead 479 is energized when the count of counter 437 is between 105,179 and 0. Accordingly, when the last active element in the video field is encoded and a pulse produced on lead 410, flip-flop 478 is set and its high output is thereby energized. READ lead 415 then remains energized until the count of counter 437 reaches 105,179. The zero value stuffing data used to fill the unused digital space in the 100 digital frames allocated for each video field is thereupon gated out of buffer storage 413 onto data stream lead 417. Since, however, flip-flop 463 is set following the last encoded variable length code word, this dummy data is not gated into serial-to-parallel converter 460. Furthermore, since leads 441 and 428 are also deenergized the zero value data is not gated into either the framing and synchronization decoder 421 or the vertical sync decoder 422.

When the count of counter 437 reaches 105,179, lead 479 is energized thereby resetting flip-flop 478. The output of flip-flop 478 and thus READ lead 415 are deenergized and data read out from buffer storage 413 is halted. When digital sync generator 405 determines that the next video field is to be decoded, a BOP pulse is produced on beginning-of-picture lead 411. Lead 411 is connected to an input of OR gate 435, the output of which is connected to the set input of flip-flop 427. Accordingly, flip-flop 427 is set in response to the BOP pulse on lead 411 and its output lead 428 is energized. READ lead 415 is thus also energized and the next data stored in buffer storage 413 is gated onto data stream 417. The data in the 105,179th to the 105,200th bit positions is the VSYNC word. Accordingly, since lead 428 has been energized, the data on data stream lead 417 is gated through AND gate 425 to vertical sync decoder 422. The decoding process for the next digitally encoded field is thus commenced.

As heretofore noted, the communications system employing the present synchronization system automatically corrects for losses in spatial synchronization that have resulted when transmission errors have inverted bits in the data stream of variable length data words. As a result of these digit invertions, a variable length decoder may recognize a word other than the transmitted word in a group of digits longer or shorter than the transmitted sequence. The subsequently decoded words will have the improper count resulting in a decoded signal that lacks spatial synchronization. Accordingly, the operation of framing and synchronization decoder 421 is described hereinbelow.

As heretofore noted, the first 14 bits in each digital frame of 1052 bits are gated through AND gate 424 into framing and synchronization decoder 421. This 14-bit sequence comprises, as heretofore discussed, a 5-bit framing sequence and a 9-bit Hamming error correction encoded representation of the relative horizontal scan line position of the next complete data word in the stream of transmitted variable length code words. Each of the 14 bits gated through AND gate 424 is entered into serial-to-parallel converter 480 in response to 14 successive $\phi$ pulses applied to serial-to-parallel converter 480 on lead 481. These 14 bits are converted into parallel format on the 14 parallel output leads 482. The first five parallel output leads upon which is the coded 5-bit framing sequence are connected in an in-frame detector 483. The sixth through 14th parallel output leads upon which is the synchronization word are connected to an error correction decoder 484. Several well-known decoder networks can be employed as decoder 484 as, for example, the Hamming decoder network illustrated in FIG. 5.05 on page 123 of the aforenoted book Algebraic Coding Theory. In-frame detector 483 examines the 5-bit framing sequence to determine that the digital stream is digitally in-frame. If framing is lost a reframe algorithm can be initiated to recapture framing. This reframe operation can be carried out in accordance with any one of a number of known techniques. The specific reframe algorithm that is utilized comprises no part of the present invention and thence a detailed description herein is not warranted. Error correction decoder 484 examines the 9-bit error correction encoded synchronization word and decodes the coded sequence into a 5-bit word on parallel leads 485. The digital representation on parallel leads 485 is a binary representation of the one-out-of-32 position information of the next code word and is thus equal to the binary representation on leads 134 at the output of sample counter 133 in FIG. 1.

Leads 485 are connected to a first set of input terminals of a 5-bit adder 486. The five least significant digits of the count of counter 450 appear in binary format on five parallel output leads 487. The binary representation on the five parallel output leads 487 is equal to the modulo-32 count of the next word to be decoded, or equivalently, the relative horizontal position of the next word in a 32-word length interval. Each of the parallel output leads 487 is connected to an inverter 488-1 to 488-5, respectively. The digital representation on the parallel output leads of inverters 488-1 through 488-5 is thus the modulo-32 complement of the representation on leads 487. The five output leads of inverters 488-1 through 488-5 are connected to a second set of input terminals of 5-bit adder 486. The 5-bit adder 486 forms a modulo-32 summation between the one-out-of-32 count on leads 485 and the modulo-32 complement of the one-out-of-32 count on leads 487. If there have been no transmission errors, the count on leads 485 will be equal to the count on the output leads 487 of counter 450. Thus, the output of 5-bit adder 486 on the five parallel output leads 489 will be equal to zero. If, however, transmission errors have occured, the count of counter 450 will be either greater or less than the count indicated on leads 485. Accordingly, the digital sequence on parallel leads 489 is a binary representation of the discrepancy between the actual horizontal position to which the next code word should be addressed and the actual position to which the next code word would otherwise be addressed based upon the count of counter 450. Accordingly, the amount of correction necessary to resynchronize count of decoded variable code words is determined by the number represented on leads 489.

As heretofore discussed, since it has been assumed that the correct absolute one-out-of 160 horizontal positions is less than five positions from the one-out-of-160 horizontal positions indicated by counter 450, the amount of correction necessary, and thus the actual position, can be determined by comparing the one-out-of-32 count on leads 485 with the modulo-32 count of counter 450. As will be detailed hereinbelow, the difference between these one-out-of-32 counts generates a number representative of the correction necessary even when the correct address and the actual address are in different 32 word segments or on different scan lines. Thus, for example, when the synchronization word is 29 and the count of counter 450 is 97 such that the count of 1 is represented on leads 487, then counter 450 is assumed to be in error by the count of 4 ([1-29] modulo-32). Thus the count of counter 450 should actually be 93. Similarly, if the synchronization word is 1 and counter 450 is at the count of 159 such that 31 is represented on leads 487, then the actual position to which counter 450 should be addressed is the first position in the next 32 word segment or, therefore, the first position on the next successive video scan line. As is apparent, therefore, the synchronization word containing only the relative one-out-of 32 relative horizontal position within a 32 position segment provides sufficient information which, when compared with the count of counter 450, enables the correct absolute horizontal position to be determined.

As will be apparent hereinafter, if the correct horizontal position is ahead of the position indicated by counter 450, then the word represented on output leads 489 of adder 486 will represent a number between 1 and 4. If, however, the correct position indicated by the synchronization word is behind the position indicated by counter 450, then the word represented on leads 489 will be between 28 and 31. As will be detailed hereinafter, if the number represented on leads 489 is outside either of these ranges, then it will be assumed that an error has occurred during the transmission of the synchronization and no correction will be made in response to the number represented on leads 489.

When modulo-1052 counter 438 reaches the count of 14 a pulse is produced on lead 490. Lead 490 is connected to an input of an AND gate 491. ECC lead 441 is connected to a second input of AND gate 491. Since ECC lead 441 remains energized until after counter 438 reaches the count of 14, the pulse on lead 490 is gated through AND gate 491. The output of AND gate 491 is connected to the set input of a flip-flop 492. The C output lead 404 of sample clock 403 is connected to the reset input of flip-flop 492. Flip-flop 492 is thus set only once each digital frame at the 14th bit thereby energizing its output lead 493 until the next C clock pulse. Lead 493 is connected to first inputs of AND gates 494-1 through 494-5, respectively. Thus, at the end of the 14-bit framing and synchronization sequence when lead 493 is energized the spatial differential on leads 489 is gated through AND gates 494-1 through 494-5 to the five parallel leads 495.

As aforenoted, if the spatial difference represented on leads 495 is between one and four, then the spatial position indicated by counter 450 is behind the actual spatial position to which this code word should be addressed. Accordingly, as will be described hereinbelow, correction is made to advance the spatial position to which the next code word in the data stream is to be addressed. If the difference indicated on leads 495 is less than zero, such that the code represented on leads 495 is between 28 and 31, then the spatial position indicated by counter 450 is ahead of the position to which this code word should actually be addressed. As will be described hereinbelow, the count of counter 450 is reduced to shift the position of the next addressed code word. As aforenoted, the maximum difference between the actual count of samples and the accumulated count of decoded samples has been assumed to differ by a maximum of five. Accordingly, address correction is made only if the difference represented on leads 495, or the modulo-32 complement of the difference on leads 495, is less than five. Otherwise, it will be assumed that a transmission error has occurred in the transmission of the 9-bit synchronization word.

Output leads 495 are connected to a comparator 496. If the difference represented on leads 495 is less than five, output lead 497 of comparator 496 is energized. Output leads 495 are connected to first inputs of AND gates 498-1 through 498-5 and lead 497 is connected to second inputs of AND gates 498-1 through 498-5, respectively. Accordingly, the digital representation on leads 495 is gated through AND gates 498-1 through 498-5 to parallel leads 499 only when it has a magnitude less than five.

Parallel leads 499 are connected to a counter 500. Output lead 493 of flip-flop 492 is connected to the set input of flip-flop 501. The high output of flip-flop 501 is connected to the clear and load inputs of counter 500. Accordingly, when the count of counter 438 reaches 14 and lead 493 is energized as heretofore described, flip-flop 501 is simultaneously set. The clear and load inputs of counter 500 are thereupon energized. Thus, at this instant, if the digital representation on leads 499 is less than five it is loaded into counter 500.

The heretofore mentioned I lead 458 is connected to the output of counter 500. I lead 458 is energized at the instant a non-zero digital representation is loaded into counter 500. L′ lead 454 is connected to a first input of an AND gate 502. C clock lead 404 is connected to a second input of AND gate 502. The output of AND gate 502 is connected to the count input of counter 500. A pulse is gated to the count input of counter 500 at each next C clock pulse instant during the active line interval. I lead 458 remains energized until the number of C clock pulses gated into counter 500 equals the count loaded into counter 500 on leads 499. As heretofore described, I lead 458 is connected to a negate input of AND gate 457. Accordingly, an SDC clock pulse is inhibited on lead 459 at each C clock pulse instant at which I lead 458 is energized. Thus, at each of these C clock pulse instants during which I lead 458 is energized READ lead 415 remains deenergized and no data is read out of buffer storage 413 into word decoder 420. However, at each C clock pulse instant a pulse is gated through AND gate 453 to the up input of counter 450 to increase its count. Since at each C pulse instant the data word on leads 467 is shifted into shift register 468, a zero value data word is clocked into shift register 468 while no new data is being entered into word decoder 420.

I lead 458 is deenergized when the number of C clock pulses gated through AND gate 502 to counter 500 reaches the count loaded into counter 500 on leads 499. The next subsequent C clock pulses generate SDC pulses on lead 459 to restart the decoding procedure. As is readily apparent, the number of SDC clock pulses inhibited on lead 459 is equal to the spatial difference indicated on lead 499. Since the count of counter 450 has continued to advance at each of these skipped instants while data read-out from buffer storage is inhibited, the next subsequent code word in the data stream will be in-count with the code indicated on output leads 485 of error correction decoder 484. I lead 458 is also connected to a negate reset input of flip-flop 501. Thus, when I lead 458 is deenergized, flip-flop 501 returns to its nominal reset state.

The operation of the hereinabove described apparatus can be more fully understood with reference to the example included within the "lead 441," "SDC" and "8-bit counter" timing diagrams of FIG. 6. As noted in the "lead 441"]timing diagram, the coded representation of the relative horizontal position of the next code word is shown, for exemplary purposes, to be 18. The count of 8-bit counter is illustratively shown to be 48. Thus, the code word to be decoded at the next C clock pulse instant would be addressed to the 48th spatial position in the horizontal scan line presently being decoded. Since only the least five significant digits of counter 450 are compared with the transmitted synchronization word, the 48th horizontal position is equivalent to 16 on a modulo-32 scale. The next word in the data stream should thus be addressed two positions ahead to the 50th horizontal position on the scan line. A digital representation of 2 thus appears on leads 489 which, when gated to counter 500, inhibits two SDC pulses from lead 459. Thus, as can be observed in the "SDC" timing diagram and the "8-bit counter" timing diagram, no SDC pulses occur at the next two C clock pulse instants while the count of 8-bit counter 450 continues to advance. At each of these two C pulse instants zero value words are entered into the decoded word stream. At the third C clock pulse instant, decoding continues and the next data read out of buffer storage 413 in the data stream is decoded and addressed to the 50th horizontal position in the scan line presently being decoded.

With reference again to FIG. 4, when the difference between the spatial position indicated by error correction decoder 484 and the spatial position indicated by counter 450 would result in a negative number, a number between 28 and 31 is represented on parallel leads 495. Resynchronization is obtained by adjustment in the count of counter 450 in a manner described hereinbelow. The five parallel leads 495 are connected to inverters 503-1 to 503-5, respectively. The signal on parallel output leads 504 of inverters 503-1 to 503-5 is thus representative of the modulo-32 complement of the numer represented on leads 495. Thus, when a number between 28 and 31 is represented on leads 495, a number between 1 and 4 is represented on lead 504. Parallel leads 504 are connected to a comparator 505. Output lead 506 of comparator 505 is energized when the word represented on parallel leads 504 is less than five.

Output leads 504 are also connected to a binary rate multiplier 507. The $\phi$ output lead 402 of master clock 401 is connected to the clock-in input 508 of binary rate multiplier 507. Binary rate multiplier 507 generates pulses at the $\phi$ pulse rate on output lead 509 in response to the code word on leads 504 and the pulses applied to the input 508. The number of pulses generated by binary rate multiplier 507 is equal to the magnitude of the signal applied on leads 504. Lead 509 is connected to an input of an AND gate 510 and output lead 506 of comparator 505 is connected to a second input of AND gate 510. Thus, when the magnitude of the signal on parallel leads 504 is less than five, the number of pulses appearing on output lead 511 of AND gate 510 is equal to the magnitude of the signal on leads 504. Lead 511 is connected to a down input of counter 450. Each pulse on lead 511 thus reduces the count of counter 450 by one. The count of counter 450 is therefore reduced by the difference in spatial positions indicated by error correction decoder 484 and counter 450 until the count of counter 450 indicates the same spatial position indicated by the received synchronization word.

Lead 511 is also connected to a counter 512. Counter 512 is cleared in response to each L pulse generated on lead 406. Each pulse gated through AND gate 510 onto lead 511 increases the count of counter 512 by one. The output of counter 512 is the aforementioned parallel leads 471 which are connected to multiplex gate 470. The count on leads 471 is thus equal to the spatial difference represented on leads 504. As aforenoted in the discussion of multiplex gate 470, the codes representation on leads 471 determines the cell of data in shift register 468 to be shifted into DPCM decoder 472. Counter 512 thus increases its count by the spatial difference on leads 504 and the data in shift register 468 is outputted from a cell other than its nominal fifth cell. The number of cells shifted is thus equal to the spatial difference represented on leads 504. In effect, therefore, to regain spatial synchronization, previously detected code words are not entered into DPCM decoder so that the subsequent words gated through shift register 468 to DPCM decoder will be in count with the synchronization word on leads 485. At the end of each video line, counter 512 is cleared by an L clock pulse and the read out from shift register 468 returns to its nominal fifth cell.

The heretofore described apparatus can best be described with reference to the illustration within the "ECC" and "8-bit counter" timing diagrams of FIG. 6. As indicated by the "lead 441" timing diagram, an illustrative error correction word indicates that the relative horizontal position of the next variable length word in the data stream is 20. Counter 450 indicates that the next code word will be the 150th code word in the scan line which is equivalent to the 22nd code word in the 5th 32-word segment. In effect, therefore, transmission errors have caused more code words to be decoded than have actually been transmitted. Thus, two previously detected code words are not decoded by decoder 472 so that words in the data stream can be directed to the proper spatial position indicated by the snychronization word. Binary rate multiplier 507 thus produces two pulses which are gated through AND gate 510 to the down input of counter 450 to decrease its count to 20. Multiplex gate 470 simultaneously shifts the read-out of shift register 468 from the fifth cell to the third cell. The code words that were in the fourth and fifth cells of shift register 468 are thus eliminated. The subsequently detected variable length code words, however, will be properly spatially addressed in accordance with the synchronization word on leads 485.

The above-described arrangement is illustrative of the application of the principles of the invention. Other embodiments may be devised by those skilled in the art without departing from the spirit and scope thereof.

What is claimed is:

1. A synchronization system for use in the transmission of a data stream of variable bit length code words comprising
first counting means for cumulatively counting said code words, second counting means operative concurrently with said first counting means for cyclically counting the cumulative number of bits in said data stream, encoding means operative when said second counting means reaches a predetermined count for generating a synchronization word by encoding the current count of said first counting means, and means for inserting said synchronization word into said data stream so that the inserted synchronization word indicates a selected code word in said data stream.

2. A synchronization system in accordance with claim 1, wherein said encoding means encodes the current count of said first counting means into a fixed length error-correction encoded synchronization word.

3. A synchronization system in accordance with claim 1, wherein said first counting means counts the code words in a cyclical manner to a predetermined maximum count, the inserted synchronization word indicating the relative count of a selected word in the data stream.

4. A synchronization system for use in the transmission of a data stream of variable bit length code words, each word in the data stream being associated with a horizontal and vertical spatial position, said synchronization system comprising a word counter for cumulatively counting each code word in the data stream, a bit counter operative concurrently with said word counter for cyclically counting the cumulative number of bits in each word in the data stream, encoding means operative when said bit counter reaches a predetermined count for generating a synchronization word by encoding the current count of said word counter, and means for inserting said synchronization word into said data stream, the inserted synchronization word indicating a spatial position associated with a selected code word in said data stream.

5. A synchronization system in accordance with claim 4, wherein said encoding means encodes the current count of said word counter into an error-correction encoded synchronization word.

6. A synchronization system in accordance with claim 4, wherein said word counter cyclically counts the successive code words associated with each horizontal sequence of spatial positions so that the inserted synchronization word indicates the horizontal position associated with a selected code word in said data stream.

7. A synchronization system in accordance with claim 6, wherein said word counter cyclically counts the successive code words associated with predetermined groups of horizontal sequences of spatial positions, each group of spatial positions being a portion of the total number of horizontal spatial positions associated with each vertical spatial position, the inserted synchronization word indicating the relative horizontal position associated with a selected code word in said data stream.

8. A transmitter for encoding and transmitting video signals, said video signals having a predetermined number of scan lines associated with each video field, each video scan line being interspaced by a horizontal sync pulse and each video field being interspaced by a verticall sync pulse, said transmitter comprising:
clocking means for generating clock pulses, sampling means for periodically sampling said video signal at said clock pulse instances, first encoding means for encoding each sample of said video signal into a variable bit length code word, means responsive to said video signals and said clocking means for generating a predetermined digital representation of said vertical sync pulse, means for combining said digital representation of said vertical sync pulse and the successive variable bit length code words generated by said first encoding means into a data stream, a word counter for cumulatively counting each code word encoded by said first encoding means, a bit counter operative concurrently with said word counter for cyclically counting the cumulative number of bits in the successive code words encoded by said first encoding means, second encoding means operative when said bit counter reaches a predetermined count for generating a synchronization word by encoding the current count of said word counter, means for inserting said synchronization word into said data stream, and transmitter output means for transmitting said data stream including said inserted synchronization word.

9. A transmitter in accordance with claim 8 wherein said second encoding means encodes the current count of said word counter into a fixed-length error correction encoded synchronization word.

10. A transmitter in accordance with claim 8 wherein said word counter cyclically counts the successive code words associated with the samples of the video signal on each scan line so that the inserted synchronization word indicates the horizontal position on the scan line associated with a selected code word in the data stream.

11. A transmitter in accordance with claim 10 wherein said word counter cyclically counts the successive code words associated with predetermined groups of the samples of the video signals on a scan line, each group of samples on each scan line being a portion of the total number of samples of each scan line, the inserted synchronization word indicating the relative horizontal position on a scan line associated with a selected code word.

12. A transmitter in accordance with claim 8 wherein said first encoding means includes means for converting the magnitude of the samples into a digital representation having a fixed number of digits, generating means for generating aa representation of the number of significant digits in each of said fixed length digital representations of said samples, an output lead, means for combining the representation of the number of significant digits and said fixed length digital representation to form on said output lead a variable bit length code word for each sample.

13. A transmitter in accordance with claim 12 wherein said first encoder means further includes means for inhibiting on said output lead said variable bit length code words when said second encoding means reaches said predetermined count.

14. A receiver for receiving and decoding a data stream of variable bit length words, each word in said data stream being a representation of a sample of a video signal, each of said words in said data stream being associated with a predetermined spatial position, said video signal having a predetermined number of video scan lines associated with a video field, each video scan line being interspaced by a horizontal sync pulse and each video field being interspaced with a vertical sync pulse, said data stream including a predetermined digital representation of said vertical sync pulse, said data stream further including synchronization words which indicate the spatial position of selected code words in said data stream, said synchronization words being interspaced by a predetermined number of bits, said receiver comprising:
detecting means for detecting said predetermined digital representation of said vertical sync pulse in said data stream, clocking means for generating clock pulses, variable bit length decoding means responsive to said clock pulses for successively detecting the received variable bit length sample code words that follow said predetermined digital representation of said vertical sync pulse in said data stream, generating means responsive to said clock pulses and said detecting means for generating signals representative of said vertical sync pulses and said horizontal sync pulses, conversion means responsive to said variable bit length decoding means and said generating means for converting the detected samples into an analog video signal, a word counter fo cumulatively counting the detected variable bit length code words, the count of said word counter indicating the spatial position of each detected variable bit length code word within the video field being decoded, a bit counter operative concurrently with said word counter for cyclically counting the cumulative number of bits in said data stream, synchronization word decoding means operative when said bit counter reaches a predetermined count for decoding the transmitted synchronization word, comparing means for comparing the spatial position indicated by said synchronization word decoding means and said word counter, and adjusting means responsive to said comparing means for adjusting the spatial positions associated with the variable bit length code words following the synchronization word in the data stream.

15. A receiver in accordance with claim 14, wherein said transmitted synchronization words indicate the horizontal position of selected code words in said data stream, and said word counter cyclically counts the indicated variable bit length code words associated with the samples of each horizontal video scan line.

16. A receiver in accordance with claim 14, wherein said comparing means includes a first comparator responsive only when the spatial position indicated by said synchronization word is ahead of the spatial position indicated by said word counter, and a second comparator responsive only when the spatial position indicated by said synchronization word is behind the spatial position indicated by said word counter.

17. A receiver in accordance with claim 16, wherein said adjusting means includes inhibiting means responsive to said first comparator for inhibiting said word counter from counting a number of variable bit length code words equal to the difference in spatial positions indicated by said word counter and said synchronization word, and means responsive to said second comparator for decreasing the count of said word counter by the difference in spatial positions indicated by said word counter and said synchronization word.

18. A transmission system for transmitting and receiving a digital representation of a video signal, said video signal having a predetermined number of scan lines associated with each video field, each video scan line being interspaced by a horizontal sync pulse and each video field being interspaced by a vertical sync pulse, said transmission system comprising:
transmitter clocking means for generating transmitter clock pulses, sampling means for periodically sampling said video signal at said transmitter clock pulse instants, first encoding means for encoding each sample of said video signal into a variable bit length code word, means responsive to said video signal and said transmitter clocking means for generating a predetermined digital representation of said vertical sync pulse, means for combining said digital representation of said vertical sync pulse and the successive variable bit length code words generated by said first encoding means into a data stream, a transmitter word counter for cumulatively counting each code word encoded by said first encoding means, a transmitter bit counter operative concurrently with said word counter for cyclically counting the cumulative number of bits in the successive code words encoded by said first encoding means, second encoding means operative when said bit counter reaches a predetermined count for generating a synchronization word by encoding the current count of said transmitter word counter, means for inserting said synchronization word in said data stream, a transmission medium, transmitter output means for transmitting said data stream onto said transmission medium, receiver input means connected to said transmission medium for receiving said transmitted data stream, receiver clocking means for generating receiver clock pulse, detecting means for detecting said predetermined digital representation of said vertical sync pulse in said received data stream, variable bit length decoding means responsive to said receiver clock pulses for successively detecting the transmitted variable bit length code words that follow said predetermined digital representation of said vertical sync pulse in said data stream, generating means responsive to said receiver clock pulses and said detecting means for generating signals representative of said vertical sync pulses and said horizontal sync pulses, conversion means responsive to said variable bit length decoding means and said generating means for converting the detected samples into an analog video signal, a receiver word counter for cumulatively counting the detected variable bit length code words, the count of said word counter indicating the spatial position of each detected variable bit length code word within the video field being decoded, a receiver bit counter operative concurrently with said receiver word counter for cyclically counting the cumulative number of bits in said received data stream, synchronization word decoding means operative when said receiver bit counter reaches said predetermined count for decoding the transmitted synchronization word, comparing means for comparing the spatial position indicated by said synchronization word decoding means and said receiver word counter, and adjusting means responsive to said comparing means for adjusting the spatial positions associated with the variable bit length code words following the synchronization word in the data stream.

19. A transmission system in accordance with claim 18 wherein said second encoding means encodes the current count of said transmitter word counter into a fixed length error correction encode synchronization word.

20. A transmission system in accordance with claim 18 wherein said transmitter word counter cyclically counts the successive code words associated with the samples of the video signal on each scan line so that the inserted synchronization word indicates the horizontal position on the scan line associated with a selected code word in the data stream.

* * * * *